(12) United States Patent
Matama

(10) Patent No.: US 6,853,400 B1
(45) Date of Patent: Feb. 8, 2005

(54) SYSTEM AND METHOD FOR CORRECTING ABERRATION OF LENSES THROUGH WHICH IMAGES ARE PROJECTED

(75) Inventor: Toru Matama, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/333,965

(22) Filed: Jun. 16, 1999

(30) Foreign Application Priority Data

Jun. 16, 1998 (JP) .......................................... 10-168325

(51) Int. Cl.[7] .................. H04N 5/223; H04N 5/225; H04N 5/228; H04N 5/217; H04N 1/46
(52) U.S. Cl. ...................... 348/96; 348/335; 348/222.1; 348/241; 358/514
(58) Field of Search ............................ 348/96, 97, 335, 348/360, 105, 222.1, 241; 358/513, 514; 355/52; 382/275; 235/462.11, 462.05; 396/6

(56) References Cited

U.S. PATENT DOCUMENTS

| | | | | |
|---|---|---|---|---|
| 5,461,440 A | * | 10/1995 | Toyoda et al. | 396/311 |
| 6,097,430 A | * | 8/2000 | Komiya | 348/218 |
| 6,155,726 A | * | 12/2000 | Ishikawa et al. | 396/575 |
| 6,219,446 B1 | * | 4/2001 | Kiriki et al. | 382/167 |
| 6,278,481 B1 | * | 8/2001 | Schmidt | 348/64 |
| 6,323,934 B1 | * | 11/2001 | Enomoto | 355/40 |
| 6,421,079 B1 | * | 7/2002 | Truc et al. | 348/96 |
| 6,603,885 B1 | * | 8/2003 | Enomoto | 382/263 |

* cited by examiner

Primary Examiner—Wendy R. Garber
Assistant Examiner—Justin Misleh
(74) Attorney, Agent, or Firm—Birch, Stewart, Kolasch & Birch, LLP

(57) ABSTRACT

In a case where aberrations of a camera lens are large, and imaging-center coordinates and reading-center coordinates coincide with each other or are located in proximity to each other within an allowable range, and trimming was not effected or center trimming was not effected, correction parameters for correcting the aberrations of the camera lens and correction parameters for correcting the aberrations of a scanner lens are integrated, and the deterioration of image quality caused by the aberrations of the camera lens and the deterioration of image quality caused by the aberrations of the scanner lens are corrected simultaneously by using the integrated parameters.

31 Claims, 16 Drawing Sheets

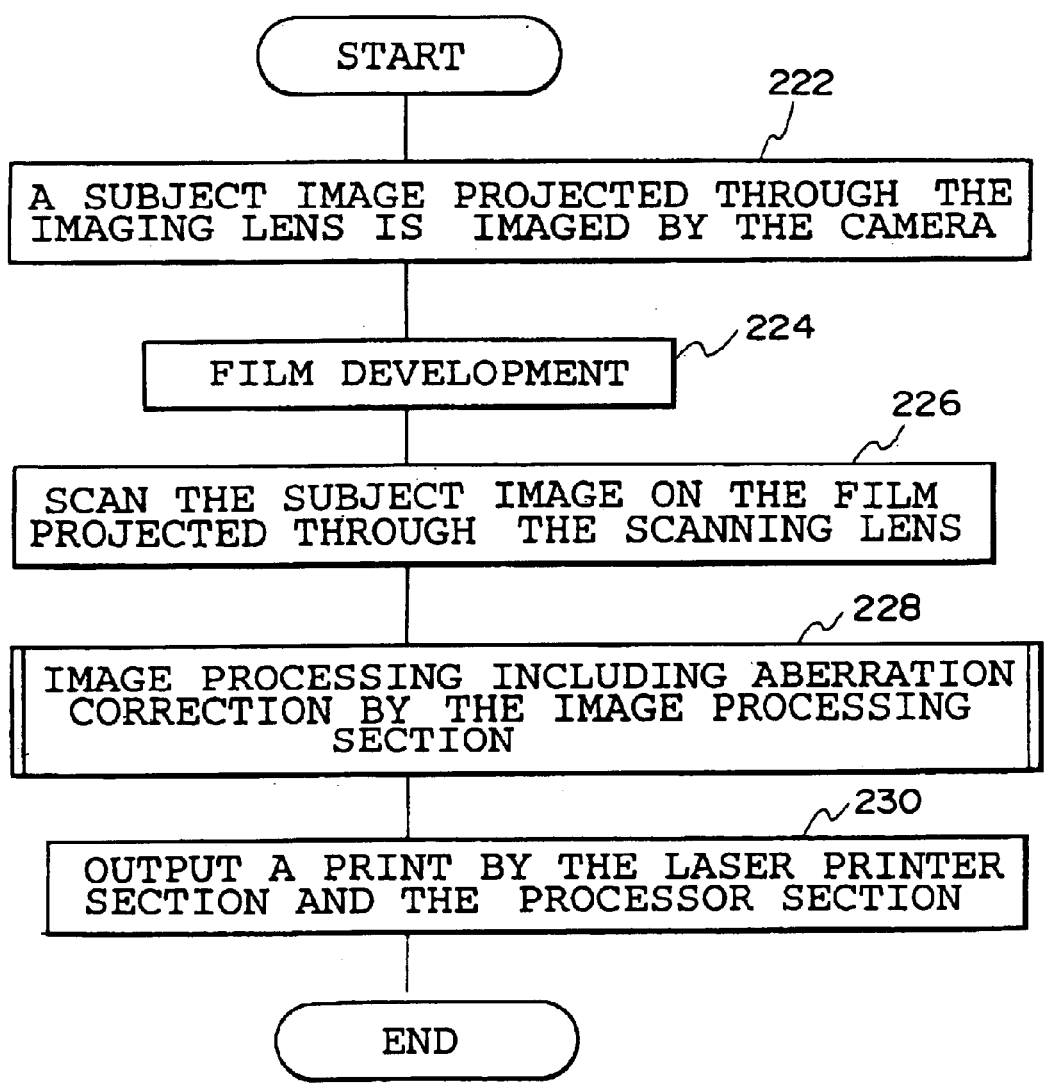

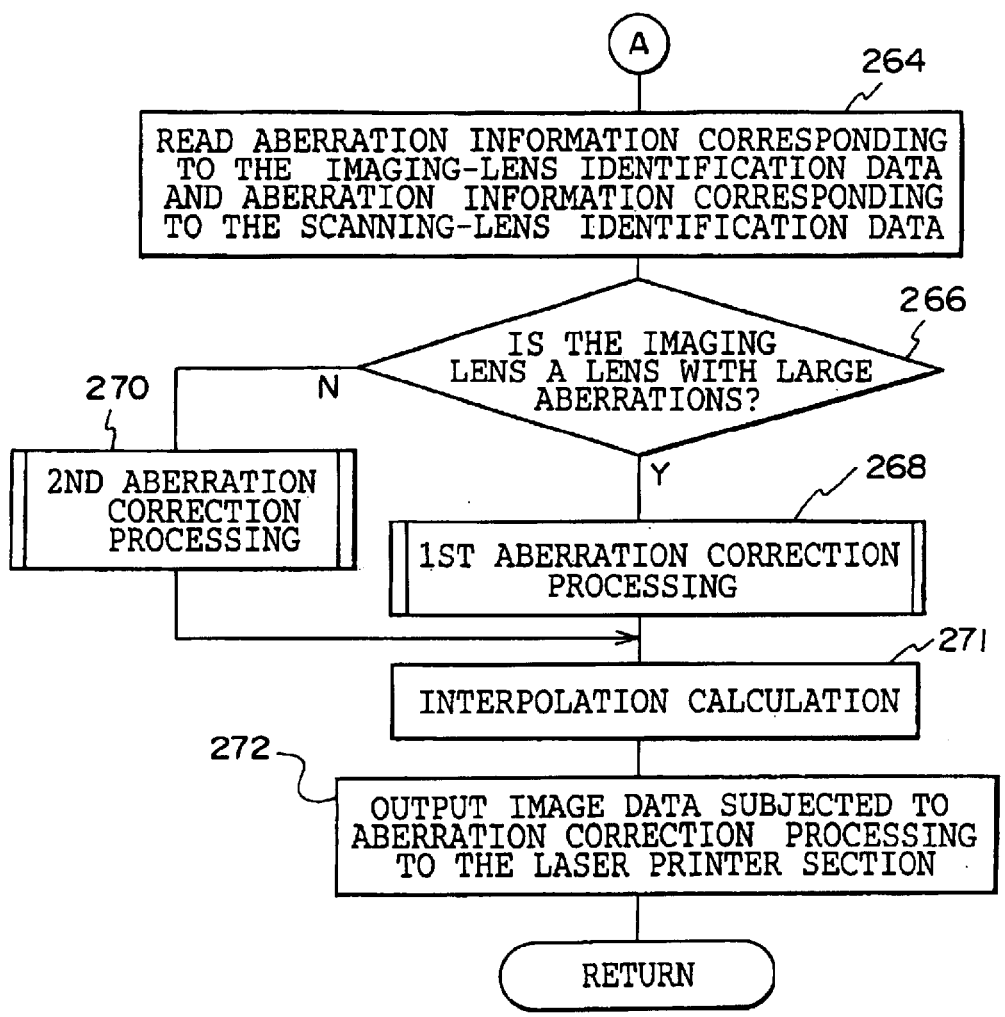

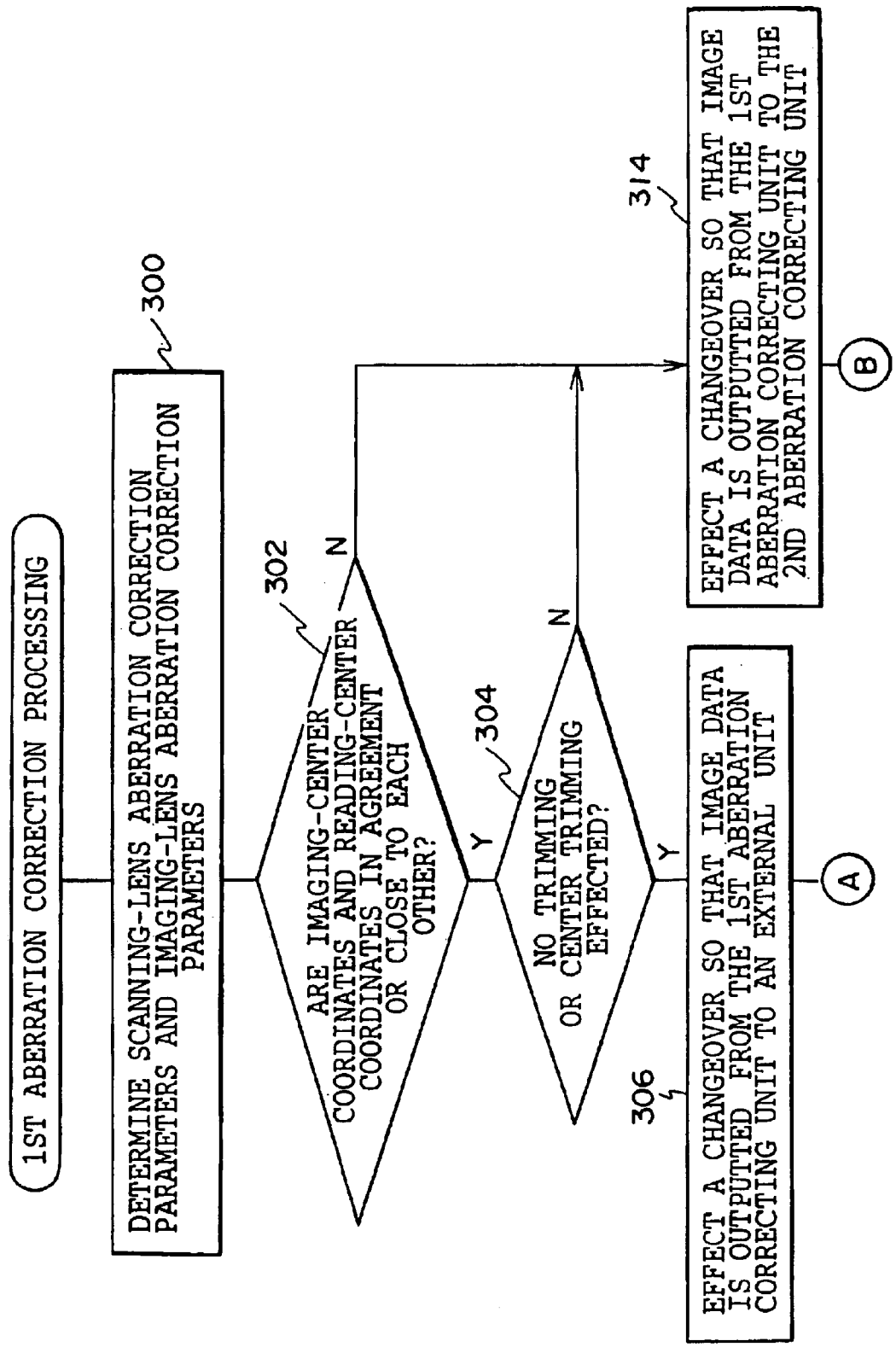

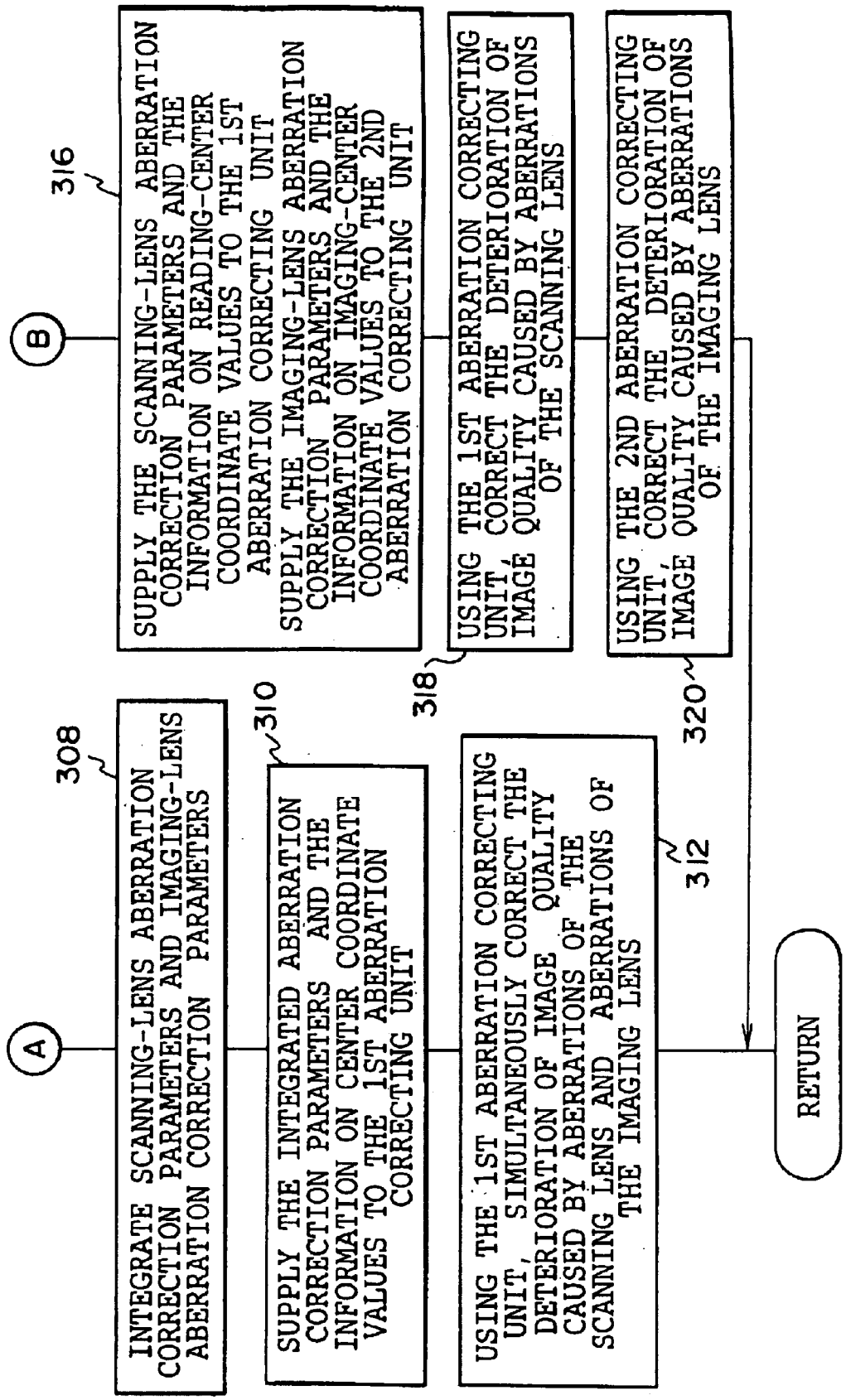

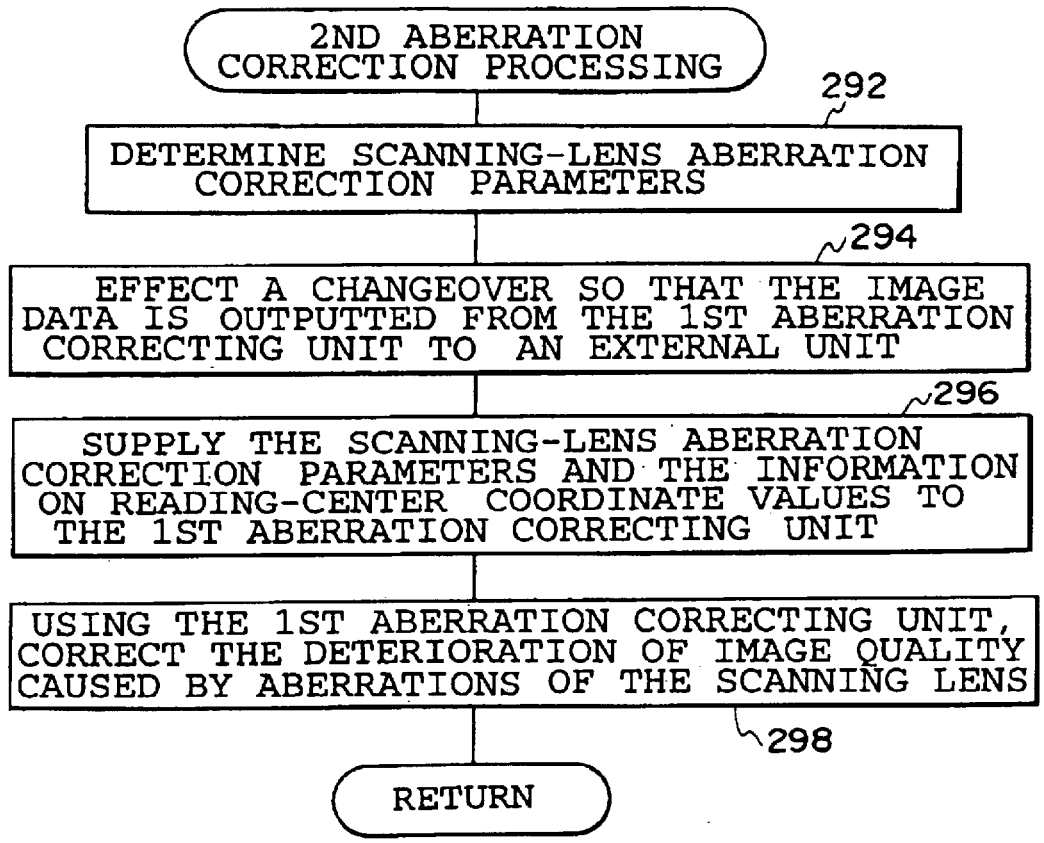

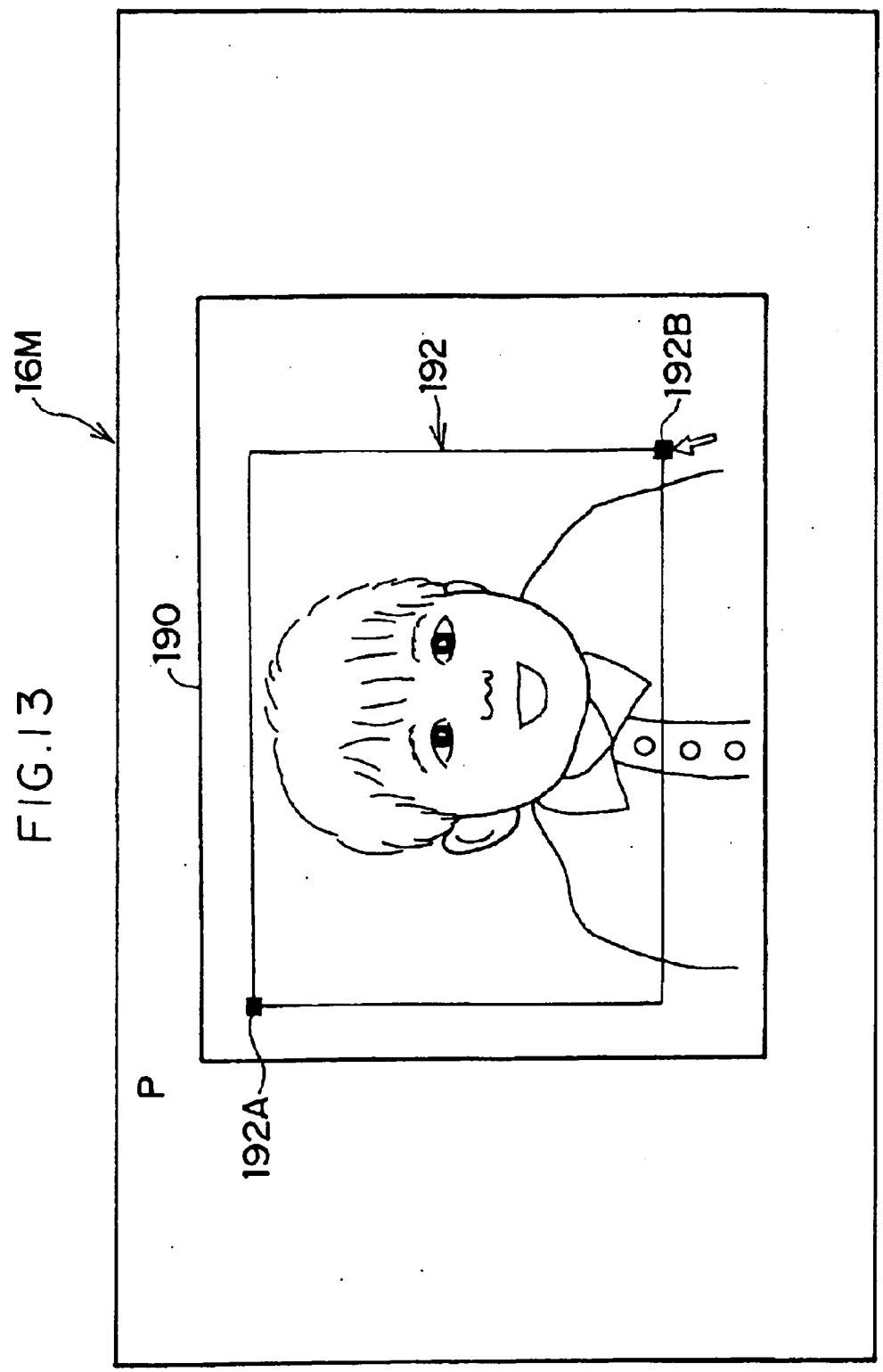

SUBJECT IMAGE

SYSTEM AND METHOD FOR CORRECTING ABERRATION OF LENSES THROUGH WHICH IMAGES ARE PROJECTED

BACKGROUND OF THE INVENTION

1. Field of the Invention

The present invention relates to an aberration correcting method, and more particularly to an aberration correcting method wherein after an image of a subject projected through a first lens is imaged, aberration correction is performed with respect to image data obtained by projecting through a second lens the subject image recorded on a photographic photosensitive material by the imaging, and by reading the subject image.

2. Description of the Related Art

Conventionally, a technique is known in which a subject is photographed by a camera, a subject image is recorded on a photographic photosensitive material such as a photographic film (such a photographic photosensitive material will be hereafter referred to as photographic film), image data representing the subject image is obtained by reading the photographic film by a scanner, and a photographic print representing the subject image is prepared on the basis of the image data obtained.

In the above-described camera, the subject image projected through a lens mounted on the camera is recorded on the photographic film. Meanwhile, the scanner reads the subject image on the photographic film, which image is projected through a lens mounted in the scanner.

Since lenses generally have aberrations, there is a possibility that the subject image projected through the aforementioned camera lens and the subject image on the photographic film projected through the scanner lens suffer a decline in their image quality due to the aberrations of the lenses. For example, owing to distortion is in the lens, there are cases where, as shown in FIG. 16A, a barrel-shaped image shown by the solid lines is obtained for a checker-patterned subject shown by the broken lines, or, as shown in FIG. 16B, a pincushion image shown by the solid lines is obtained for a checker-patterned subject shown by the broken lines. Further, there are cases where, as shown in FIG. 17, color blurs of red and blue occur in black-and-white boundary portions of a subject image owing to the chromatic aberration of magnification.

With respect to the scanner lens, in particular, since the magnification of projection onto a CCD is close to a 100% magnification, it is difficult to design a lens with minimized aberrations. For this reason, there is concern of a decline in the image quality of the subject image on the photographic film, which subject image is projected through the scanner lens.

Moreover, with the above-described technique, there is a possibility that the image quality of photographic prints prepared declines substantially due to both the aberration of the camera lens and the aberration of the scanner lens.

SUMMARY OF THE INVENTION

The present invention has been devised to overcome the above-described problems, and its object is to provide an aberration correcting method which makes it possible to obtain photographic prints of excellent image quality in a case where a subject is imaged by a camera to record the subject image on a photographic film, image data representing the subject image is obtained by reading the photographic film by a scanner, and a photographic print representing the subject image is prepared on the basis of the obtained image data.

To attain the above object, in accordance with a first aspect of the present invention, there is provided an aberration correcting method wherein after an image of a subject projected through a first lens is imaged by imaging means in which a photographic photosensitive material is loaded, aberration correction is performed with respect to image data obtained by projecting through a second lens the subject image recorded on the photographic photosensitive material by the imaging, and by reading the subject image by image reading means, comprising the steps of: obtaining information on the aberration of the first lens and information on the aberration of the second lens; and with respect to the image data representing the subject image and obtained by reading with the image reading means, simultaneously correcting declines in image quality of the subject image represented by the image data, which declines are due to the aberrations of the first and second lenses, on the basis of the obtained information on the aberrations of the first and second lenses.

In addition, in accordance with a second aspect of the present invention, there is provided an aberration correcting method wherein after an image of a subject projected through a first lens is imaged by imaging means in which a photographic photosensitive material is loaded, aberration correction is performed with respect to image data obtained by projecting through a second lens the subject image recorded on the photographic photosensitive material by the imaging, and by reading of the subject image by image reading means, comprising the steps of: obtaining information on the aberration of the first lens and information on the aberration of the second lens; determining whether or not an aberration amount of the first lens is greater than or equal to a predetermined aberration amount; and if the aberration amount of the first lens is greater than or equal to the predetermined aberration amount, with respect to the image data, simultaneously correcting declines in the image quality of the subject image represented by the image data, which declines are due to the aberrations of the first and the second lenses, on the basis of the information on the aberrations of the first and the second lenses, and if the aberration amount of the first lens is less than the predetermined aberration amount, with respect to the image data, correcting the decline in the image quality of the subject image represented by the image data, which decline is due to the aberration of the second lens, on the basis of the information on the aberration of the second lens.

In the second aspect, it is determined whether or not the aberration amount of the first lens is greater than or equal to the predetermined aberration amount by determining whether the first lens corresponds to one of predetermined lenses whose aberrations are large.

In the second aspect, whether or not the aberration amount of the first lens is greater than or equal to the predetermined aberration amount is determined on the basis of image data which is obtained by imaging an image of a reference subject projected via the first lens onto the photographic photosensitive material, and projecting via the second lens a reference subject image which is recorded on the photographic photosensitive material by the imaging, and reading the projected image by the image reading means so as to obtain the image data.

In the second aspect, optical characteristic information of the first lens is obtained, and whether or not the aberration amount of the first lens is greater than or equal to the predetermined aberration amount is determined on the basis of the obtained optical characteristic information.

In the first or second aspect, the information on the aberration of the lenses is any of information expressing the aberration of the lens, a correction parameter for correcting an aberration of the lens, and information expressing the type of the imaging means.

In addition, in the aberration correcting method according to the first or second aspect of the invention, the information on the aberration of the second lens is obtained by reading by the image reading means a predetermined image for inspection projected through the second lens, by detecting distortion of the image for inspection due to the aberration of the second lens on the basis of image data obtained by the reading, and on the basis of the detected distortion of the image for inspection.

In the aberration correcting method according to the first aspect of the invention, after an image of a subject projected through the first lens is imaged by the imaging means in which a photographic photosensitive material such as a photographic film (hereafter, the photographic photosensitive material will be simply referred to as the photographic film) is loaded, aberration correction is performed with respect to image data obtained by projecting through the second lens the subject image recorded on the photographic film by the imaging, and by reading the subject image by the image reading means.

In this aberration correcting method, information on the aberration of the first lens and information on the aberration of the second lens are first obtained.

Here, for example, with respect to each of the first and second lenses, after information on the aberrations of various types of lenses is stored in advance for each item of lens identification information, lens identification information concerning the subject lens may be obtained, and information on the aberration of the lens corresponding to the identification information may be obtained. Alternatively, the information on the aberration of the subject lens may be obtained directly.

It should be noted that, as the information on the aberration of the lens, information representing the aberration of the lens may be used, or a correction parameter for correcting the aberration of the lens may be used. Further, as the aforementioned image reading means, it is possible to adopt an optical reading apparatus such as a scanner which is adapted to read a subject image projected through the second lens by means of a line CCD sensor or area CCD sensors.

Next, with respect to the image data representing the subject image and obtained by reading by the image reading means, a decline in the image quality of the subject image, represented by the image data, due to the aberrations of the first and second lens is simultaneously corrected on the basis of the obtained information on the aberrations of the first and second lenses.

In the above-described case, if, for example, information representing the aberration of the lens is obtained as the information on the aberration of the lens with respect to each of the first and second lenses, correction parameters are determined for correcting the declines in the image quality of the subject image caused by the aberrations. Further, correction parameters are determined for simultaneously correcting the declines in the image quality of the subject image represented by the image data, which declines are due to the aberrations of the first and second lenses, by integrating the determined correction parameter concerning the first lens and the determined correction parameter concerning the second lens.

In the above-described case, if, for example, a correction parameter for correcting the aberration of the lens is obtained as the information on the aberration of the lens with respect to each of the first and second lenses, in the same way as described above, correction parameters are determined for correcting the declines in, the image quality of the subject image caused by the aberrations. Further, correction parameters are determined for simultaneously correcting the declines in the image quality of the subject image represented by the image data, which declines are due to the aberrations of the first and second lenses, by integrating the obtained correction parameter concerning the first lens and the obtained correction parameter concerning the second lens.

Then, correction is effected with respect to the image data obtained by reading with the image reading means, in accordance with the determined correction parameters for simultaneous correction.

Thus it is possible to efficiently correct the declines in the image quality of the subject image represented by the image data obtained by reading with the image reading means, which declines are due to the aberrations of the first and second lenses.

In addition, even in a case where an imaging means having an inexpensive lens and an image reading means (scanner or the like) having an inexpensive lens are used, excellent image quality can be obtained.

The first lens for projecting a subject image during imaging is generally mounted on the imaging means such as a camera. If a single-lens reflex camera, for example, is used as the imaging means, the aberrations of the lens mounted thereon are considerably small, so that no special aberration correction is required. On the other hand, if an inexpensive camera such as a lens fitted film package is used as the imaging means, the aberrations of the lens fitted therein are large, so that aberration correction is required. Thus, in the case of the first lens, there is a diversity in the relative magnitude in the aberration depending on its lens types, and if the aberrations of the lens are small, aberration correction is not necessarily required.

Here, in the aberration correcting method of the second aspect, in the same way as in the first aspect, information on the aberration of the first lens and information on the aberration of the second lens are obtained, and a determination is made as to whether the amount of aberration of the first lens (the lens for projecting the image of the subject during imaging) is greater than or equal to a predetermined aberration amount.

As in the second aspect, it can be determined whether or not the aberration amount of the first lens is greater than or equal to the predetermined aberration amount by determining whether the first lens corresponds to one of predetermined lenses whose aberrations are large. Further, as in the second aspect, whether or not the aberration amount of the first lens is greater than or equal to the predetermined aberration amount may be determined on the basis of image data which is obtained by imaging an image of a reference subject projected via the first lens onto the photographic photosensitive material, and projecting via the second lens a reference subject image which is recorded on the photographic photosensitive material by the imaging, and reading the projected image by the image reading means so as to obtain the image data. Moreover, as in the second aspect, optical characteristic information of the first lens may be obtained, and whether or not the aberration amount of the first lens is greater than or equal to the predetermined aberration amount may be determined on the basis of the obtained optical characteristic information.

If the aberration amount of the first lens is greater than or equal to the predetermined aberration amount, as in the first aspect, on the basis of the information on the aberrations of the first and second lenses, the declines in image quality of the subject image expressed by the image data, which declines are caused by the aberrations of the first and second lenses, are corrected simultaneously for the image data.

If the aberration amount of the first lens is less than the predetermined aberration amount, on the basis of the information on the aberration of the second lens, the decline in image quality of the subject image expressed by the image data, which decline is caused by the aberration of the second lens, is corrected for the image data on the basis of the information on the aberration of the second lens. Namely, aberration correction is carried out for only the aberration of the second lens.

In this way, aberration correction of the aberrations of the first and second lenses is carried out simultaneously only in the case in which the aberration amount of the first lens is greater than or equal to the predetermined aberration amount. Thus, aberration correction can be carried out appropriately in accordance with the magnitude of the aberration of the first lens.

The information on the aberration of the lenses (the first and second lenses) is any of information expressing the aberration of the lens, a correction parameter for correcting the aberration of the lens, and information expressing the type of the imaging means.

In the above-described aspect of the invention, the information on the aberration of the second lens is determined as follows. Namely, a predetermined image for inspection projected through the second lens is read by the image reading means. Incidentally, as the image for inspection, it is possible to adopt, among others, an image in which a plurality of straight lines are respectively depicted in a plurality of predetermined directions.

Next, distortion of the image for inspection due to the aberration of the second lens is detected on the basis of image data obtained by the reading. It should be noted that the "distortion of the image" means not the distortion of the image caused only by the distortion of the lens,-but the distortion of the image ascribable to the entire aberrations of the lens, including spherical aberration, the chromatic aberration of magnification, and the like. The same also applies to the "distortion of the image" described below.

For instance, if the image data obtained by reading and the image data of the predetermined image for inspection are developed in the same two-dimensional coordinate system through image processing, the distortion of the image of the image for inspection due to the aberration of the second lens can be detected from the offset, distortion, and the like of the images developed in the two-dimensional coordinate system. Then, information on the aberration of the second lens is determined from the detected distortion of the image of the image for inspection. Thus, it is possible to easily determine the information on the aberration of the second lens.

BRIEF DESCRIPTION OF THE DRAWINGS

FIG. 6 is a flowchart illustrating a processing routine for aberration correction processing.

FIGS. 7A and 7B are a flowchart illustrating a subroutine of image processing by the image processing section.

FIGS. 8A and 8B are a flowchart illustrating a subroutine for first aberration correction processing.

FIG. 9 is a flowchart illustrating a subroutine for second aberration correction processing.

FIG. 13 is a diagram explaining trimming processing.

DESCRIPTION OF THE PREFERRED EMBODIMENT

Referring now to the accompanying drawings, a description will be given of an embodiment of the present invention.

Schematic Configuration of Digital Lab System

Figure 1:
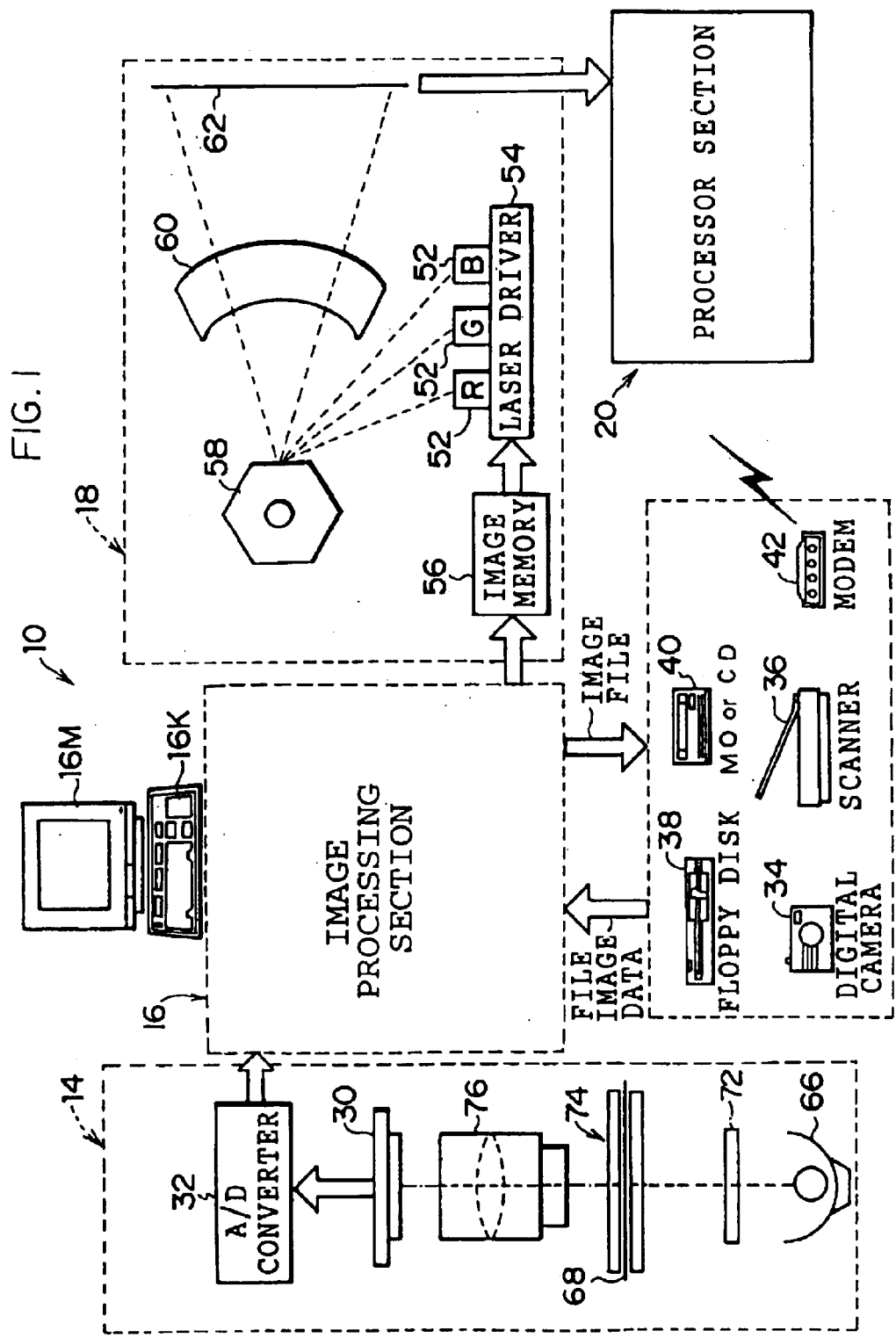
FIG. 1 is a schematic diagram illustrating the configuration of a digital lab system in accordance with an embodiment of the present invention.
Figure 2:
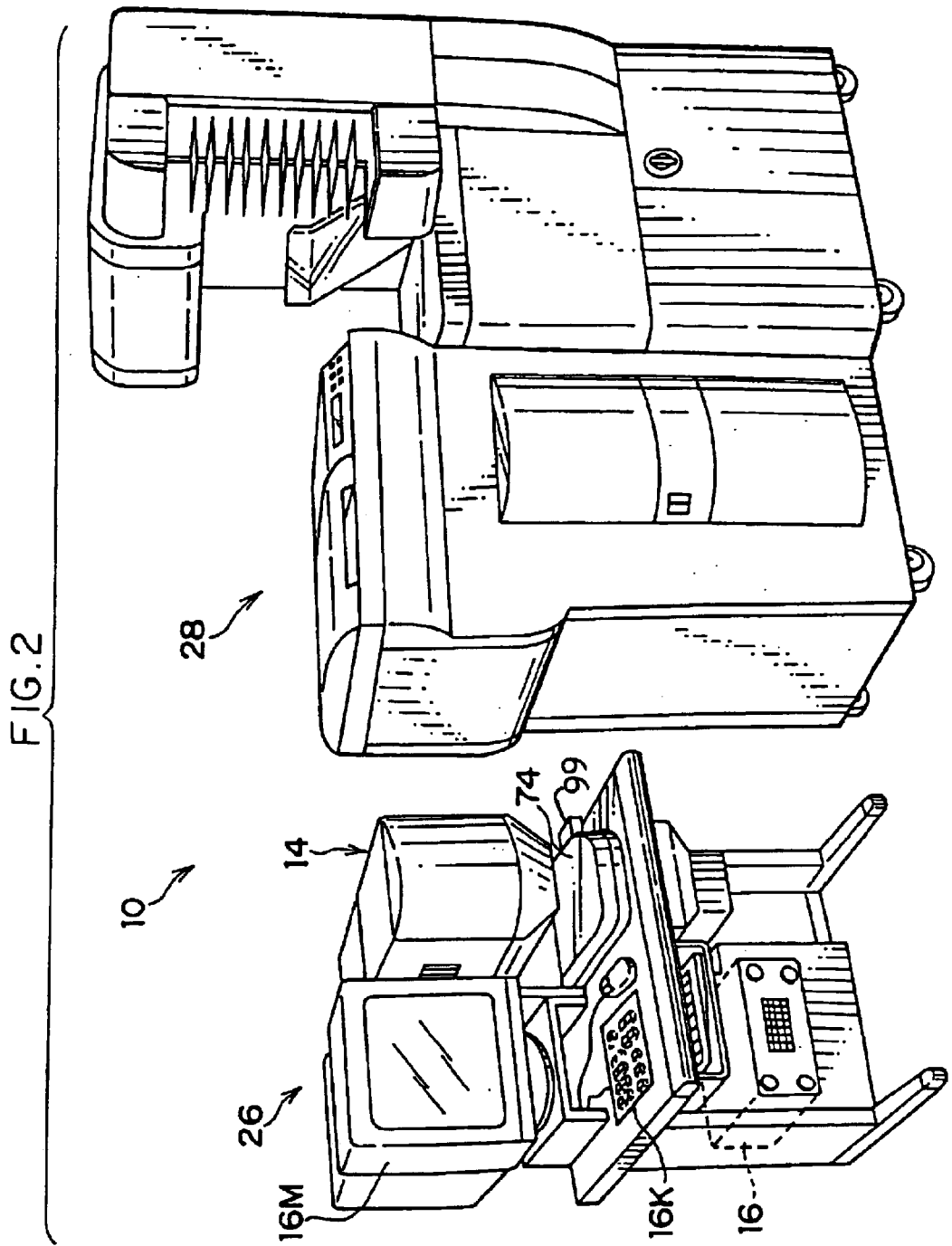
FIG. 2 is an external view of the digital lab system.

FIGS. 1 and 2 show a schematic configuration of a digital lab system 10 in accordance with this embodiment.

As shown in FIG. 1 this digital lab system 10 is comprised of a line CCD scanner 14, an image processing section 16, a laser printer section 18, and a processor section 20. The line CCD scanner 14 and the image processing section 16 are integrated as an input section 26 shown in FIG. 2, while the laser printer section 18 and the processor section 20 are integrated as an output section 28 shown in FIG. 2.

The line CCD scanner 14 is for reading frame images recorded on a photographic film such as a negative film or a reversal film, and its objects to be read can be frame images on photographic films, e.g., a 135-size photographic film, a 110-size photographic film, a photographic film with a transparent magnetic layer formed thereon (a 240-size photographic film: so-called APS film), and 120-size and 220-size (Brownie size) photographic films. In the line CCD scanner 14, the light emitted from a light source 66 is formed into diffused light by a light diffusing plate 72, and is applied to a frame image on a photographic film 68 on a film carrier 74. The light transmitted through the frame image is made incident upon a lens unit 76, and an image based on the transmitted light is formed on a light-receiving surface of a line CCD 30 by the lens unit 76. Here, the frame image thus formed is read by the line CCD 30, and image data obtained in this reading is subjected to A/D conversion by an A/D converting unit 32, and is then outputted to the image processing section 16. Incidentally, the photographic film, i.e., an object to be read, is inserted through a film insertion port 99 shown in FIG. 2, and frame images on the photographic film are consecutively positioned at the position of reading by the line CCD 30 by means of an unillustrated transporting mechanism.

The image processing section 16 is arranged such that image data (scanned image data) outputted from the line CCD scanner 14 is inputted thereto, and the following image data can be also inputted thereto from the outside: image data obtained by imaging using a digital camera 34 or the like, image data obtained by reading an original (e.g., a reflecting original) by means of a scanner 36 (flatbed type), image data generated by another computer and recorded on a floppy disk drive 38, an MO or CD drive 40, communication image data received through a modem 42, and so forth (hereafter, such image data will be generally referred to as filed image data).

Although a detailed description will be given later of the image processing section 16, in this image processing section 16, the inputted image data is subjected to various image processing, including color balance adjustment, contrast adjustment, distortion correction, and correction of the chromatic aberration of magnification, and the image data subjected to image processing is outputted to the laser printer section 18 as image data for recording. In addition, the image processing section 16 is also capable of outputting the image data subjected to image processing to the outside as an image file (for example, the image data is outputted to a recording medium, such as an FD, a MO, and a CD, or transmitted to other information processing equipment through a communication line).

The laser printer section 18 has R, G, and B laser light sources 52 which, under control by a laser driver 54, apply to photographic printing paper 62 laser light modulated in accordance with the image data for recording inputted from the image processing section 16 (and stored temporarily in an image memory 56), thereby recording images on the photographic printing paper 62 by scanning exposure (in this embodiment, by an optical system mainly using a polygon mirror 58 and an fq lens 60). Meanwhile, the processor section 20 subjects the photographic printing paper 62 with the images recorded thereon by scanning exposure in the laser printer section 18 to various processing including color development, bleach-fix, washing, and drying. As a result, images are formed on the photographic printing paper.

Configuration of Image Processing Section

Figure 3:
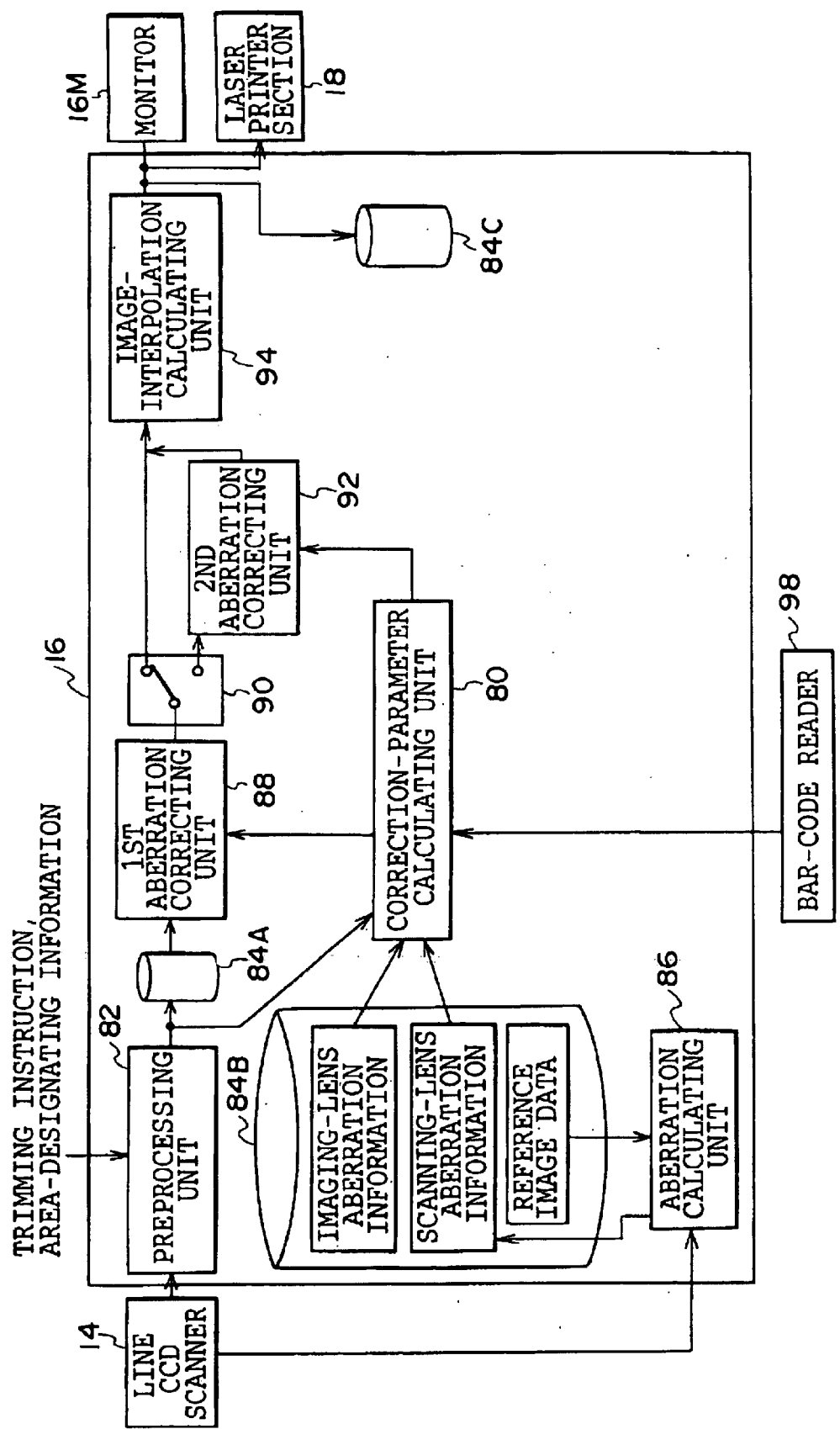
FIG. 3 is a block diagram illustrating the configuration of an image processing section.

Referring next to FIG. 3, a description will be given of the configuration of the image processing section 16. As shown in FIG. 3, the image processing section 16 is comprised of the following: a preprocessing unit 82 for subjecting the image data inputted from the line CCD scanner 14 or the like to image processing including contrast adjustment (color gradation processing), dark correction, defective pixel correction, shading correction, and trimming based on a trimming instruction; a first aberration correcting unit 88 and a second aberration correcting unit 92 for correcting a decline in the image quality caused by aberrations of a lens (hereafter referred to as an imaging lens) 162 of a camera 160 (see FIG. 12) used at the time of imaging and aberrations of the lens unit (hereafter referred to as the scanning lens) 76 of the line CCD scanner 14 shown in FIG. 1; a changeover unit 90 for effecting a changeover concerning whether the output data from the first aberration correcting unit 88 is to be inputted to the second aberration correcting unit 92 or it is to be inputted to an outside unit (the monitor 16M or the laser printer section 18) located outside the image processing section 16; a storage unit 84 for storing the image data, lens aberration information, which will be described later, and so on; a correction-parameter calculating unit 80 for calculating aberration correction parameters on the basis of lens aberration information as well as image center coordinate information and image resolution information, which will be described later; an aberration calculating unit 86 for calculating aberrations concerning a scanning lens whose aberrations are unknown; and an image-interpolation calculating unit 94 for calculating interpolation, which will be described later, with respect to the image data.

Figure 10:
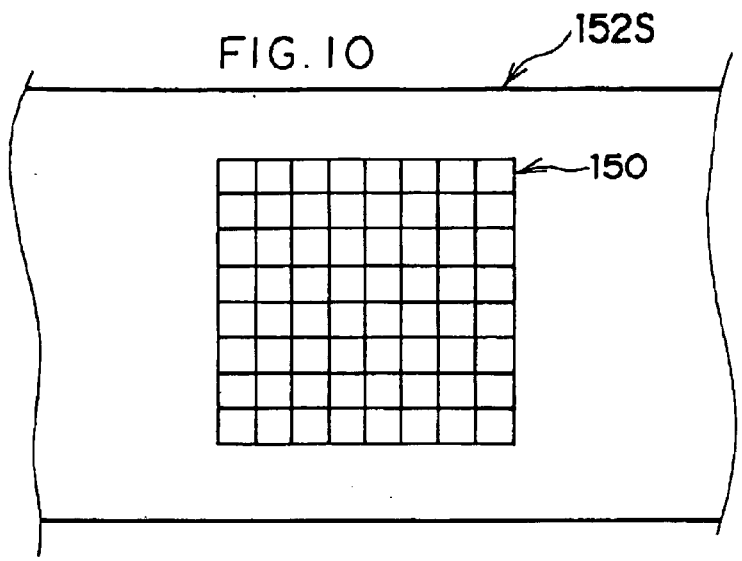
FIG. 10 is a diagram illustrating a film on which a cross-ruled chart has been recorded in advance.

The storage unit 84, illustrated as being separately installed as units 84A, 84B, and 84C, is formed by a non-volatile memory such as a hard disk. In addition to the aforementioned image data, information on the aberrations of the imaging lenses is stored in advance in the storage unit 84 for each lens identification data, and information on the aberrations of the scanning lenses is stored in advance therein for each lens identification data and each scanning magnification. Further, image data (reference image data used in the calculation of aberrations of the scanning lens, as will be described later) representing a cross-ruled chart 150 recorded on a film 152S shown in FIG. 10 is stored in advance in the storage unit 84.

Although, in FIG. 3, the storage unit 84 is illustrated as being separately installed as storage units 84A, 84B, and 84C to facilitate inputs and outputs of various data and information, the storage unit 84 may be actually formed by a single storage unit (e.g., a hard disk), or may be formed by a plurality of storage units.

Figure 11:
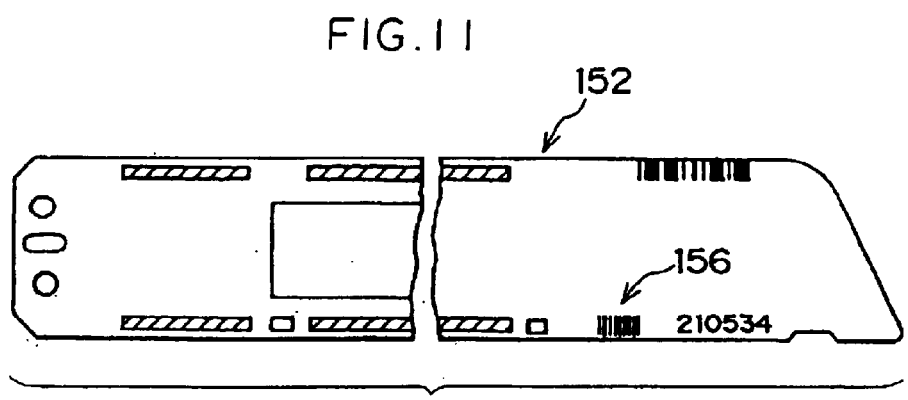
FIG. 11 is a diagram illustrating a film on which a latent-image bar code representing the lens identification data of an imaging lens has been recorded in advance.
Figure 12:
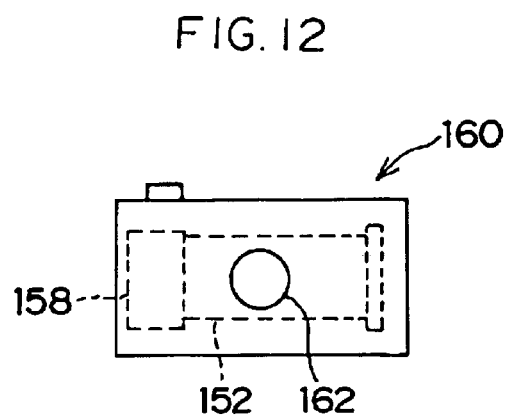
FIG. 12 is a schematic diagram of a camera (lens fitted film package) used in imaging.

In addition, in this embodiment, a description is given of an example in which a lens fitted film package 160 shown in FIG. 12 is adopted as an imaging device (camera). The lens identification data of the imaging lens 162 fitted to the lens fitted film package 160 is recorded in advance in a film 152, which is incorporated in the lens fitted film package 160, as a latent-image bar code 156, as shown in FIG. 11. Accordingly, the operator renders the bar code 156 visible by developing the film 152, reads the bar code 156 by a bar-code reader 98 shown in FIG. 3, and inputs the thus-obtained lens identification data of the imaging lens 162 to the correction-parameter calculating unit 80.

Further, in this embodiment, the image of a subject based on the inputted image data can be displayed on a monitor 16M as shown in FIG. 13, an image area which is to be captured onto the photographic print can be designated on a displayed image 190 by the operator, and image data representing the image within the designated image area can be extracted from the inputted image data. Namely, so-called trimming is possible.

Specifically, the operator consecutively designates a first reference point 192A and a second reference point 192B by means of a mouse, and instructs execution of trimming by a predetermined operation, thereby extracting image data representing the image within a rectangular image area 192 having the reference points 192A and 192B as vertices of a diagonal line. It should be noted that limitations may be imposed on the position of the second reference point 192B corresponding to the first reference point 192A so that the aspect ratio of the image area 192 corresponds to a designated print size (e.g., one of the L size, panorama size, and HDTV size).

Configurations of Aberration Correcting Units

Next, referring to FIG. 4, a description will be given of the configurations of the first aberration correcting unit 88 and the second aberration correcting unit 92 (hereafter, these units will be referred to as the aberration correcting units). The configurations of the aberration correcting units 88 and 92 are shown in FIG. 4 and are identical.

Figure 4:
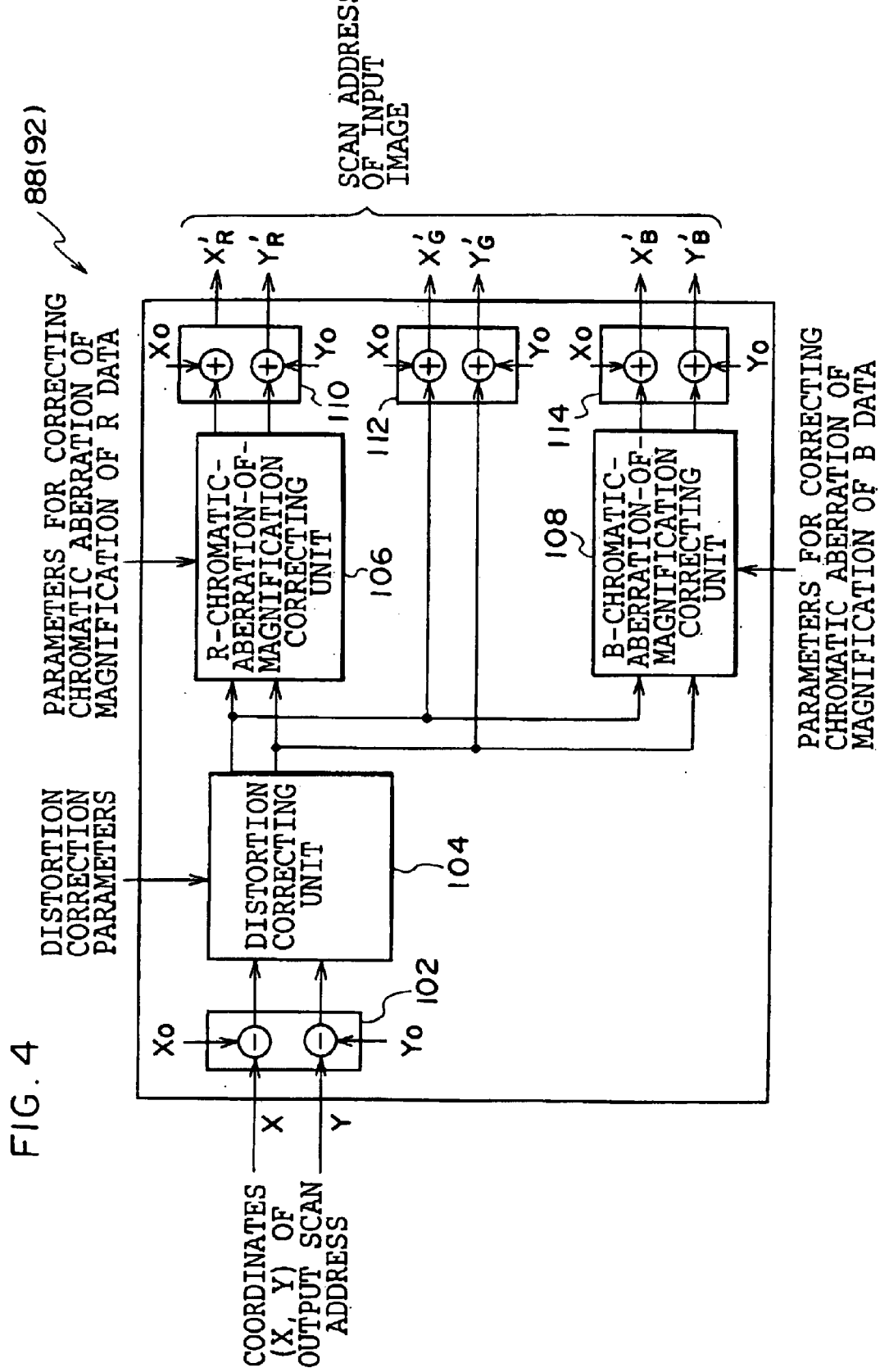
FIG. 4 is a block diagram illustrating the configuration of an aberration correcting section.

As shown in FIG. 4, the aberration correcting unit 88 (92) is comprised of a subtractor 102, a distortion correcting unit 104, an R-chromatic-aberration-of-magnification correcting unit 106 for correcting the chromatic aberration of magnification of the R color by using the G color as a reference, a B-chromatic-aberration-of-magnification correcting unit 108 for correcting the chromatic aberration of magnification of the B color by using the G color as a reference, and adders 110, 112, and 114.

Figure 14A:
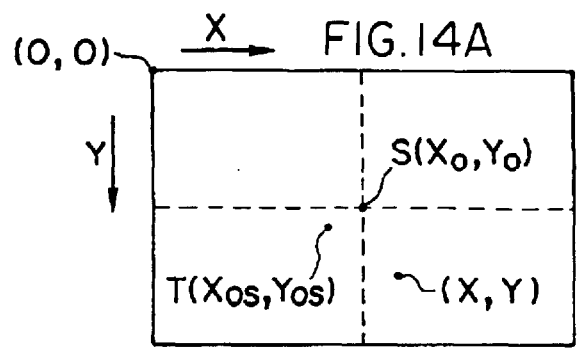
FIG. 14A is a diagram illustrating a virtual two-dimensional coordinate system in which image data is developed when image processing is effected in the image processing section.
Figure 14B:
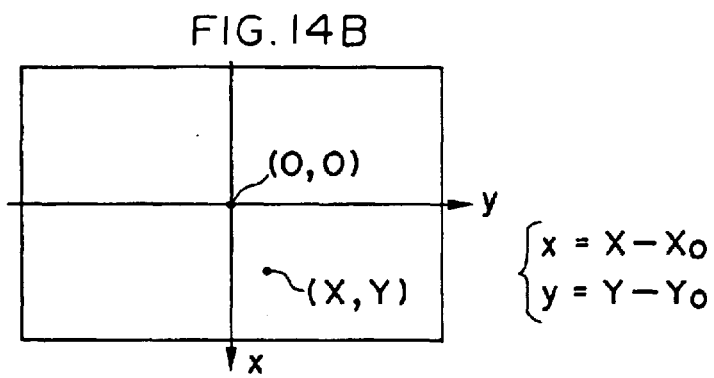
FIG. 14B is a diagram illustrating a two-dimensional coordinate system in which an imaging center S(X0, Y0) is set as the origin.

The inputted image data is expressed by an X-Y coordinate system as shown in FIG. 14A, whereas the aberration correction information of the imaging lens 162 is expressed by a two-dimensional coordinate system (hereafter referred to as the coordinate system for correcting the aberrations of the imaging lens) having an imaging center S(X0, Y0) shown in FIG. 14B as the origin. Therefore, before effecting aberration correction with respect to the aberrations of the imaging lens 162, it is necessary to convert the inputted image data into data of the coordinate system for correcting the aberrations of the imaging lens.

Figure 14C:
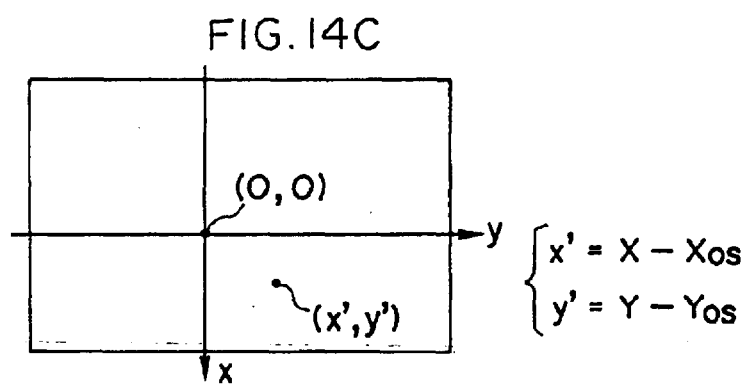
FIG. 14C is a diagram illustrating a two-dimensional coordinate system in which a reading center T(X0S, Y0S) is set as the origin.

In addition, since the aberration correction information of the scanning lens 76 is expressed by a two-dimensional coordinate system (hereafter referred to as the coordinate system for correcting the aberrations of the scanning lens) having a scanning center T(X0S, Y0S) shown in FIG. 14C as the origin, before effecting aberration correction with respect to the aberrations of the scanning lens 76, it is necessary to convert the inputted image data into data of the coordinate system for correcting the aberrations of the scanning lens.

Therefore, in the aberration correcting unit 88 (92), coordinate values (X, Y) of each pixel are transformed into coordinate values (x, y) of the coordinate system for correcting the aberrations of the imaging lens or the coordinate system for correcting the aberrations of the scanning lens by subtracting center coordinate values (i.e., imaging-center coordinate values (X0, Y0) or reading-center coordinate values (X0S, Y0S)) from the coordinate values (X, Y) of each pixel of the inputted image data by using the subtractor 102. The image data of the pixels whose coordinate values have been transformed is inputted to the distortion correcting unit 104 to effect correction by using the distortion correction parameters of the lens.

Of the image data subjected to the distortion correction, the image data of the R color (R data) is inputted to the R-chromatic-aberration-of-magnification correcting unit 106, and is subjected to correction of the chromatic aberrations of magnification of the R color using the G color as a reference by using parameters for correcting chromatic aberrations of magnification concerning the R data. Meanwhile, the image data of the B color (B data) is inputted to the B-chromatic-aberration-of-magnification correcting unit 108, and is subjected to correction of the chromatic aberrations of magnification of the B color using the G color as a reference by using parameters for correcting chromatic aberrations of magnification concerning the B data.

Since the image data of the G color (G data) is used as a reference for correcting the chromatic aberration of magnification, it is not subjected to correction of the chromatic aberration of magnification, and is inputted to the adder 112, and its center coordinate values are added to the coordinate values (x, y) of each pixel by the adder 112. Consequently, the coordinate values (x, y) of each pixel are inversely transformed into coordinate values of the X-Y coordinate system shown in FIG. 14A.

Similarly, the R data subjected to correction of the chromatic aberration of magnification of the R color is inputted to the adder 110, and its center coordinate values are added to the coordinate values (x, y) of each pixel by the adder 110, thereby inversely transforming the coordinate values (x, y) of each pixel into coordinate values of the X-Y coordinate system shown in FIG. 14A. In addition, the B data subjected to correction of the chromatic aberration of magnification of the B color is inputted to the adder 114, and its center coordinate values are added to the coordinate values (x, y) of each pixel by the adder 114, thereby inversely transforming the coordinate values (x, y) of each pixel into coordinate values of the X-Y coordinate system shown in FIG. 14A.

The image data (RGB data) whose coordinate values have been inversely transformed in the above-described manner are outputted from the aberration correcting unit 88 (92).

The aberration correction calculation is a coordinate transformation in the X-Y coordinate system, as shown in FIG. 4. An output scan address (X, Y) is inputted, and coordinates (X'R, Y'R), (X'G, Y'G), and (X'B, Y'B) in which its coordinates have undergone distortion due to aberration are obtained. If input image data corresponding to the obtained coordinates is interpolated by the image-interpolation calculating unit 94 shown in FIGS. 3 and 18, output image data in which the aberrations have been connected is obtained.

In each of the distortion correcting unit 104, the R-chromatic-aberration-of-magnification correcting unit 106, and the B-chromatic-aberration-of-magnification correcting unit 108, coordinates which are free of aberration are inputted thereto, and calculation is performed for obtaining coordinates which produced aberrations.

Figure 18:
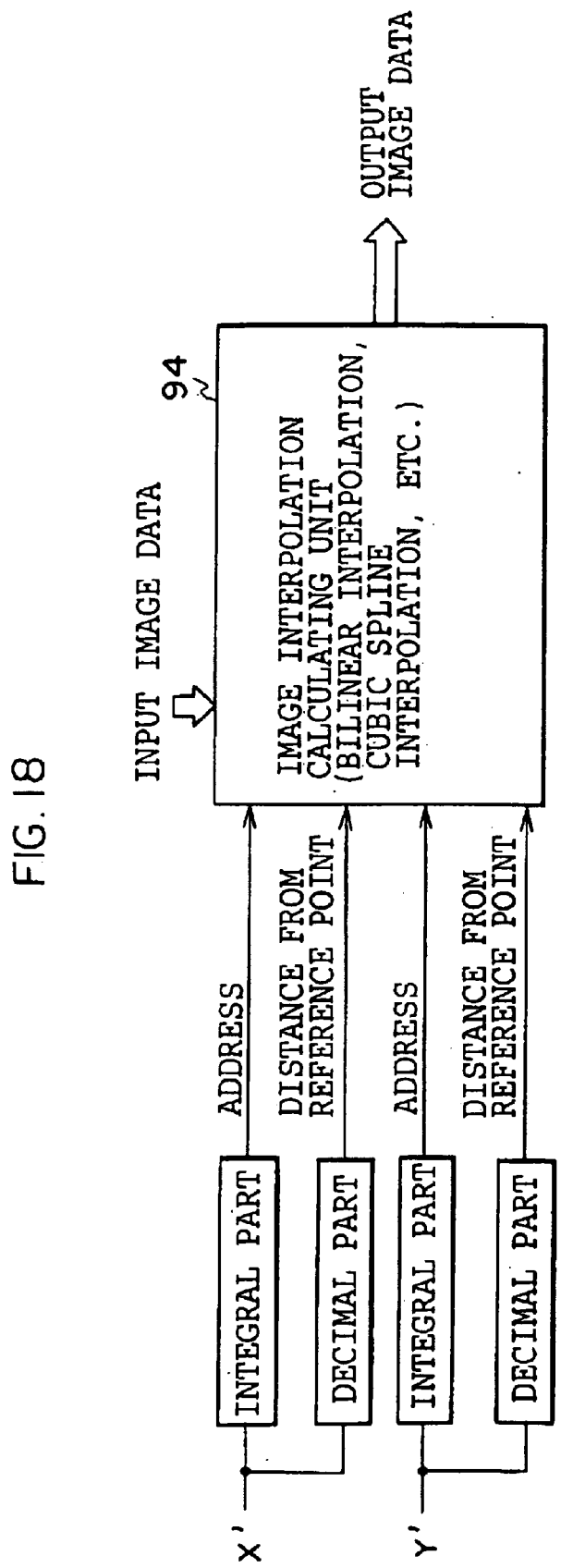
FIG. 18 is a diagram explaining interpolation calculation by an image-interpolation calculating unit.

In the image-interpolation calculating unit 94 in FIGS. 3 and 18, known bilinear interpolation, cubic spline interpolation or the like is performed. Of these interpolations, if the bilinear interpolation is performed, an integral part (IX'G, IY'G) of (X'G, Y'G), for example, becomes a reference address, and image data at four points in its neighborhood are referred to. In addition, as the weighting coefficient of interpolation, it suffices if a decimal part of (X'G, Y'G) is given.

In a case where enlargement/reduction processing is effected by electronic variable power, it is desirable to incorporate the aforementioned coordinate transformation into the processing. For example, if the electronic variable power rate is set to N, the processing can be realized by adding a multiplication in which the coordinates (X'R, Y'R), (X'G, Y'G), and (X'B, Y'B) are multiplied by (1/N).

In each of the first aberration correction processing and second aberration correction processing which will be described later, it is desirable that the image interpolation calculation be performed at one time by the image-interpolation calculating unit 94, as shown in FIG. 3. The reason for this is that since the interpolation calculation involves a decline in sharpness and the occurrence of artifacts, if the interpolation calculation is performed twice or more, the image quality declines substantially.

Method of Calculating the Aberration of Scanning Lens

Here, referring to the flowchart shown in FIG. 5, a description will be given of a method of calculating the aberration of a scanning lens whose aberration is unknown. To simplify the description, FIG. 5 shows a series of procedures including the operator's operation.

Figure 5:
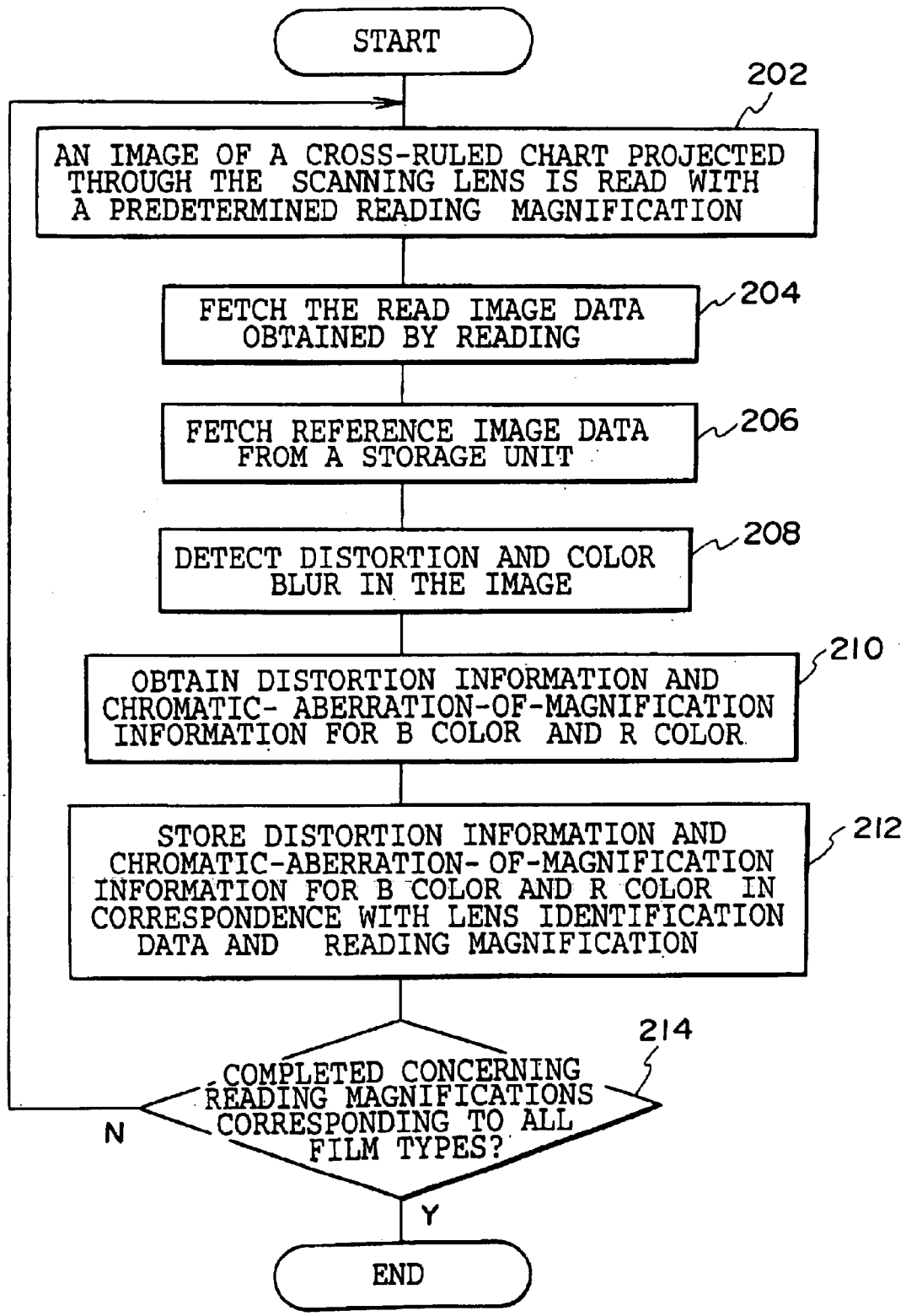
FIG. 5 is a flowchart illustrating a processing routine for aberration calculation processing of a scanning lens.
Figure 7A:
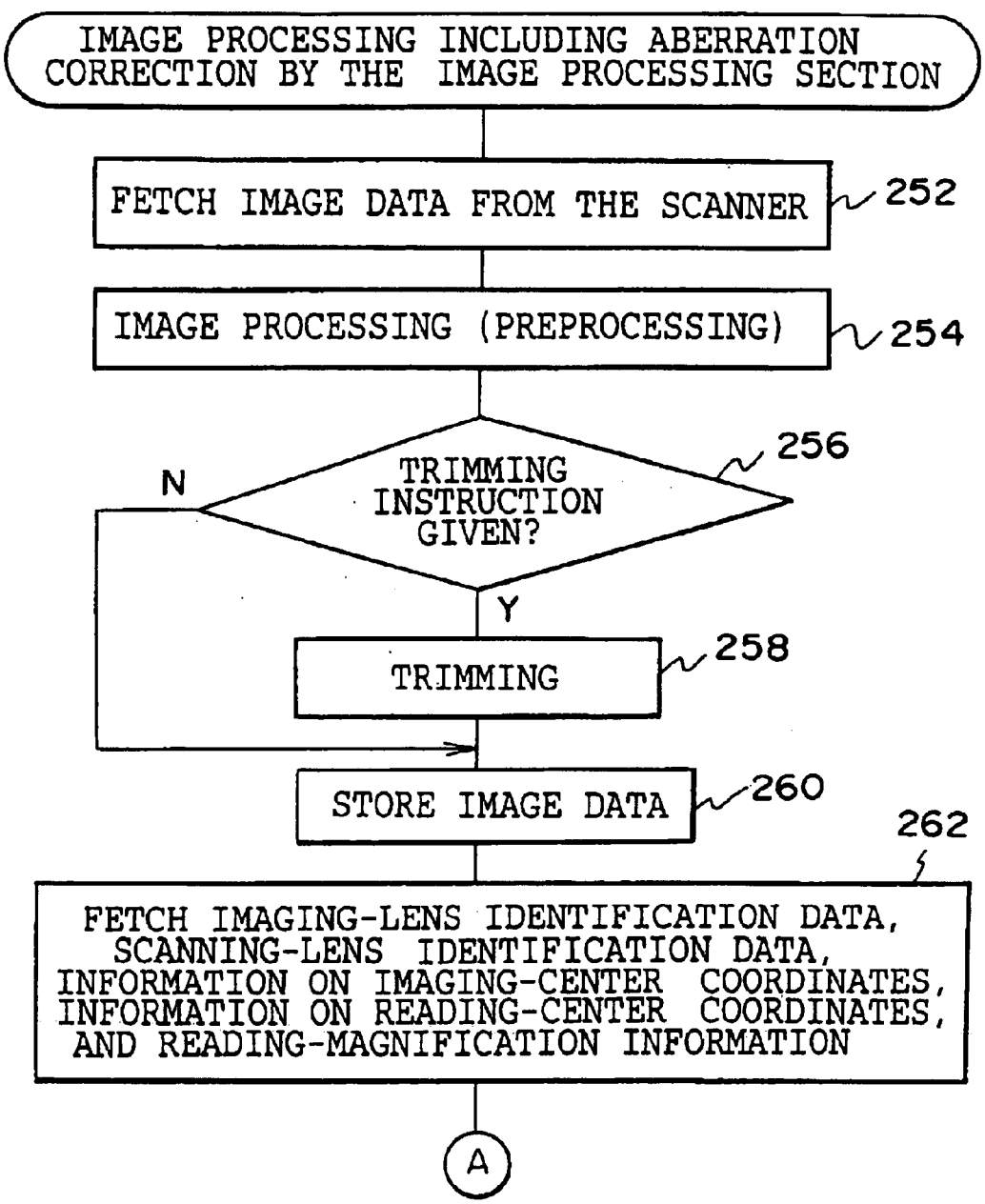

In Step 202 in FIG. 5, the operator inserts the film 152S, on which the cross-ruled chart 150 shown in FIG. 10 has been recorded, into the film insertion port 99 (see FIG. 2), and the operator reads an image of the cross-ruled chart projected through the scanning lens 76 in the line CCD scanner 14, by scanning the image by means of the line CCD 30. It is assumed that, at this time, the image is read with a reading magnification which corresponds to one of the film types (APS film, 135 film, and Brownie-type film).

In an ensuing Step 204, the image data representing the image of the cross-ruled chart 150 obtained in the above reading (hereafter, this image data will be referred to as the read image data) and the lens identification data of the scanning lens 76 are fetched from the line CCD scanner 14 to the aberration calculating unit 86.

In an ensuing Step 206, the aberration calculating unit 86 fetches the reference image data representing the cross-ruled chart 150 stored in advance (hereafter, this image data will be referred to as the reference image data) from a storage unit 84. In an ensuing Step 208, by developing the read image data and the reference image data in the same virtual two-dimensional coordinate system and by determining the offset of the two developed images, the aberration calculating unit 86 detects the distortion and color blur (here, the respective amounts of offset of the B color and the R color using the G color as a reference) of the image of the cross-ruled chart 150 in the aforementioned two-dimensional coordinate system (i.e., the image projected through the scanning lens 76).

In an ensuing Step 210, distortion information of the scanning lens 76 is determined on the basis of the detected distortion of the image, and chromatic-aberration-of-magnification information for the B color and the R color of the scanning lens 76 is determined on the basis of the detected color blur of the image. As a result, the distortion information corresponding to the reading magnification step 202 above and the chromatic-aberration-of-magnification information for the B color and the R color can be obtained. Then, in an ensuing step 212, the thus-obtained distortion information and the chromatic-aberration-of-magnification information for the B color and the R color are stored in the storage unit 84 in accordance with the lens identification data and the reading magnification.

Thereafter, if it is determined that more film types exist in Step 214, the operation returns to Step 202, and the image of the cross-ruled chart 150 is read with a read magnification corresponding to another film type, and the distortion information corresponding to the reading magnification and the chromatic-aberration-of-magnification information for the B color and the R color are determined in the same way as described above on the basis of the read image data obtained by reading and the reference image data.

As described above, with respect to the scanning lens 76 whose aberration is unknown, it is possible to easily determine the distortion information corresponding to the reading magnification corresponding to each film type (APS film, 135 film, and Brownie-type film) as well as the chromatic-aberration-of-magnification information for the B color and the R color. The distortion information and the chromatic-aberration-of-magnification information for the B color and the R color thus obtained can be stored in the storage unit in correspondence with the lens identification data and the reading magnification.

Operation of the Embodiment

Next, referring to the flowcharts shown in FIGS. 6 to 9, as operation of this embodiment, processing will be described in which after an image of a subject projected through the imaging lens 162 is imaged, aberration correction is performed with respect to image data obtained by projecting through the scanning lens 76 the subject image recorded on the photographic film 152 by the imaging, and by reading the subject image. It should be noted that the description of the flowcharts is given by including the processing which is performed by the photographer and the operator, so as to facilitate the understanding of the flow of processing. It is assumed that an APS film is used as the photographic film 152, by way of example.

First, referring to FIG. 6, a description will be given of rough flow of processing. First, in Step 222 in FIG. 6, a photographer photographs subjects by using the lens fitted film package 160 shown in FIG. 12. Consequently, images of the subjects projected through the imaging lens 162 are recorded on the photographic film 152. In an ensuing Step 224, the photographer delivers the photographed photographic film 152 to a laboratory, and an operator in the laboratory develops the photographic film 152. As a result, the images of the subjects and the bar code 156 representing the lens identification data of the imaging lens 162 are made visible on the photographic film 152.

In an ensuing Step 226, the operator inserts the photographic film 152 through the film insertion port 99 shown in FIG. 2, and reads the image of each subject projected through the scanning lens 76 in the line CCD scanner 14, by scanning the image by means of the line CCD 30. In an ensuing Step 228, although details will be described later, the image data representing the image of the subject obtained by reading is inputted to the image processing section 16, and various image processing, including distortion correction and correction of chromatic aberration of magnification for correcting the aberrations of the imaging lens 162 and the scanning lens 76, is performed with respect to the image data in the image processing section 16. In an ensuing Step 230, image formation processing based on the image data subjected to image processing and outputted from the image processing section 16 is effected by the laser printer section 18 and the processor section 20, so as to prepare photographic prints on which the subject images based on the image data are recorded.

In the above-described manner, photographic prints are obtained which are based on the image data representing the subject images subjected to distortion correction and correction of chromatic aberration of magnification for correcting the aberrations of the imaging lens 162 and the aberrations of the scanning lens 76.

Next, referring to FIGS. 7A to 9, a detailed description will be given of image processing which is executed in Step 228 in FIG. 6. In Step 252 in FIG. 7A, the image data representing the image of the subject obtained by reading in Step 226 in FIG. 6 is fetched into the image processing section 16. In an ensuing Step 254, processing, such as color balance adjustment, contrast adjustment (color gradation processing), dark correction, defective pixel correction, shading correction, and the like, is effected with respect to the image data by the preprocessing unit 82 by using a known method such as LUT and matrix (MTX) calculation or the like. It should be noted that in the above-described image processing, the image data is developed in the virtual two-dimensional coordinate system such as the one shown in FIG. 14A, so as to perform image processing with respect to the image data corresponding to each pixel. Through the above-described image processing, resolution information in both the X-axis direction and Y-axis direction shown in FIG. 14A is obtained.

In an ensuing Step 256, a determination is made as to whether or not an instruction for executing the above-described trimming has been given by the operator. If the instruction for executing trimming has been given, in Step 258, trimming for extracting the image data representing an image within the designated image area 192 shown in FIG. 13 is effected by the preprocessing unit 82.

In an ensuing Step 260, the image data subjected to the above-described image processing is stored in the storage unit 84A, and the operator reads the bar code 156 on the photographic film 152 by means of the bar-code reader 98. Then, in an ensuing Step 262, the lens identification data of the imaging lens 162 obtained by reading the bar code 156 is inputted to the correction-parameter calculating unit 80. At the same time, the lens identification data of the scanning lens 76, information on the reading magnification, and information on imaging-center coordinates (X0, Y0) and information on reading-center coordinates (X0S, Y0S) in the two-dimensional coordinate system in FIG. 14A are fetched to the correction-parameter calculating unit 80 from the line CCD scanner 14.

In an ensuing Step 264, aberration information corresponding to the aforementioned lens identification data of the imaging lens 162 (i.e., aberration information of the imaging lens 162), as well as aberration information corresponding to the lens identification data of the scanning lens 76 and the reading magnification (i.e., aberration information of the scanning lens 76), are fetched to the correction-parameter calculating unit 80 from the storage unit 84B. In an ensuing Step 266, on the basis of the lens identification data of the imaging lens 162, a determination is made as to whether or not the aberration amount of the imaging lens 162 is greater than or equal to a predetermined aberration amount. Namely, in the present embodiment, a determination is made as to whether the imaging lens 162 corresponds to one of predetermined lenses whose aberrations are large.

Here, if the imaging lens 162 corresponds to a lens whose aberrations are large, the operation proceeds to Step 268 in which the subroutine of first aberration correction processing in FIGS. 8A and 8B, which will be described later, is executed, and the deterioration of image quality caused by the aberrations of the imaging lens 162 and the aberrations of the scanning lens 76 is corrected for the image data. On the other hand, if the imaging lens 162 does not correspond to a lens whose aberrations are large, the operation proceeds to Step 270 in which the subroutine of second aberration correction processing in FIG. 9, which will be described later, is executed, and the deterioration of image quality caused by only the aberrations of the scanning lens 76 is corrected for the image data. Then, in an ensuing Step 271, interpolation calculation is effected with respect to the image data subjected to aberration correction processing by means of the image-interpolation calculating unit 94. In an ensuing Step 272, the image data subjected to first or second aberration correction processing is outputted to the laser printer section 18. Consequently, photographic prints of excellent quality, on which images based on the image data subjected to aberration correction have been recorded, are prepared (Step 230 in FIG. 6).

Next, a description will be given of the first aberration correction processing in FIGS. 8A and 8B. In Step 300 of FIG. 8, the correction-parameter calculating unit 80 determines aberration correction parameters for correcting the deterioration of image quality caused by the aberrations of the scanning lens 76 (hereafter, these parameters will be referred to as the scanning-lens aberration correction parameters) on the basis of the aberration information of the scanning lens 76. Also, the correction-parameter calculating unit 80 determines aberration correction parameters for correcting the deterioration of image quality caused by the aberrations of the imaging lens 162 (hereafter, these parameters will be referred to as the imaging-lens aberration correction parameters) on the basis of the aberration information of the imaging lens 162. It should be noted that, in this embodiment, a description will be given of an example in which the deterioration of image quality caused by distortion and chromatic aberrations of magnification of the R color and the B color using the G color as a reference, among the aberrations of lenses, is corrected. Hence, in Step 300, the scanning-lens aberration correction parameters and the imaging-lens aberration correction parameters are determined with respect to each of the distortion, chromatic aberrations of magnification of the R color, and chromatic aberrations of magnification of the B color, respectively.

In an ensuing Step 302, a determination is made as to whether or not the imaging-center coordinates (X0, Y0) and the reading-center coordinates (X0S, Y0S) coincide with each other or are located in proximity to each other within a predetermined allowable range. In an ensuing Step 304, a determination is made as to whether or not no trimming was effected with respect to the image data, or center trimming was effected (whether trimming which is not center trimming was effected).

Here, if the imaging-center coordinates (X0, Y0) and the reading-center coordinates (X0S, Y0S) coincide with each other or are located in proximity to each other within the predetermined allowable range, and if no trimming was effected or center trimming was effected, the operation proceeds to Step 306 to effect a changeover in the changeover unit 90 so that the image data outputted from the first aberration correcting unit 88 will be directly outputted to an external unit located outside the image processing section 16 (in FIG. 3, the changeover unit 90 is changed over upward). In an ensuing Step 308, the scanning-lens aberration correction parameters and the imaging-lens aberration correction parameters are integrated with respect to distortion, chromatic aberrations of magnification of the R color, and chromatic aberrations of magnification of the B color, respectively, as follows.

Figure 15:
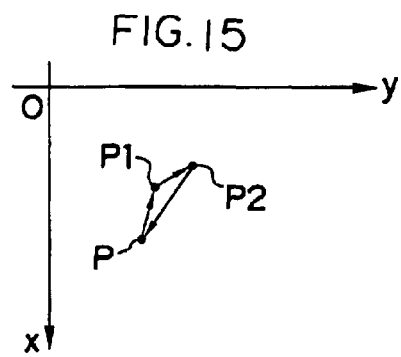
FIG. 15 is a diagram explaining an outline of the integration of scanning-lens aberration correction parameters and imaging-lens aberration correction parameters.
Figure 16A:
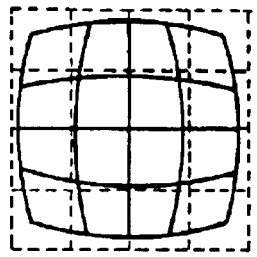
FIG. 16A is a diagram illustrating an image in which a barrel-shaped distortion has occurred due to the distortion of the lens.
Figure 16B:
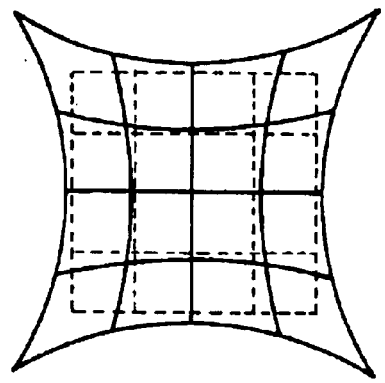
FIG. 16B is a diagram illustrating an image in which a pincushion distortion has occurred due to the distortion of the lens.
Figure 17:
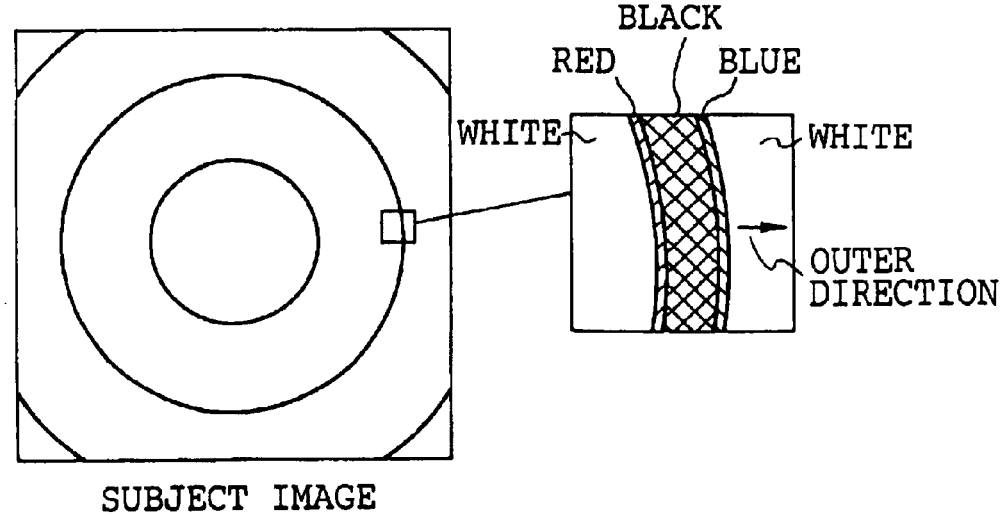
FIG. 17 is a diagram illustrating color blur due to the chromatic aberration of magnification of the lens.

For instance, if distortion is taken as an example, if it is assumed that, as shown in FIG. 15, one pixel at a pixel position P has undergone a positional offset to a position P1 due to the distortion of the imaging lens 162, the pixel is further positionally offset from the position P1 to a position P2 due to the distortion of the scanning lens 76. Here, correction parameters concerning distortion are set in such a manner as to return the pixel from the position P2 to the normal pixel position P (to cause distortion in a direction opposite to the direction of the aforementioned distortion).

In an ensuing Step 310, the integrated aberration correction parameters regarding each of the distortion, chromatic aberrations of magnification of the R color, and chromatic aberrations of magnification of the B color, as well as information on the center coordinate values (either one of the imaging-center coordinate values (X0, Y0) and the reading-center coordinate values (X0S, Y0S)), are supplied from the correction-parameter calculating unit 80 to the first aberration correcting unit 88. In an ensuing Step 312, in the first aberration correcting unit 88, both the deterioration of image quality caused by the aberrations of the imaging lens 162 and the deterioration of image quality caused by the aberrations of the scanning lens 76 are corrected simultaneously by using the integrated aberration correction parameters regarding each of the distortion, chromatic aberrations of magnification of the R color, and chromatic aberrations of magnification of the B color.

Namely, in the first aberration correcting unit 88 shown in FIG. 4, the coordinate values (X, Y) of each pixel are transformed into the coordinate values (x, y) of the coordinate system for correcting the aberrations of the imaging lens or the coordinate system for correcting the aberrations of the scanning lens by subtracting the center coordinate values (the imaging-center coordinate values (X0, Y0) or the reading-center coordinate values (X0S, Y0S) supplied in Step 310) from the coordinate values (X, Y) of each pixel of the inputted image data by using the subtractor 102. The image data of the pixels whose coordinate values have been transformed is inputted to the distortion correcting unit 104 to effect correction by using the distortion correction parameters of the lens.

Of the image data subjected to the distortion correction, the image data of the R color (R data) is inputted to the R-chromatic-aberration-of-magnification correcting unit 106, and is subjected to correction of the chromatic aberrations of magnification of the R color using the G color as a reference by using parameters for correcting chromatic aberrations of magnification concerning the R data. Meanwhile, the image data of the B color (B data) is inputted to the B-chromatic-aberration-of-magnification correcting unit 108, and is subjected to correction of the chromatic aberrations of magnification of the B color using the G color as a reference by using parameters for correcting chromatic aberrations of magnification concerning the B data.

Since the image data of the G color (G data) is used as a reference for correcting the chromatic aberration of magnification, it is not subjected to correction of the chromatic aberration of magnification, and is inputted to the adder 112, and its center coordinate values are added to the coordinate values (x, y) of each pixel by the adder 112. Consequently, the coordinate values (x, y) of each pixel are inversely transformed into coordinate values of the X-Y coordinate system shown in FIG. 14A.

Similarly, the R data subjected to correction of the chromatic aberration of magnification of the R color is inputted to the adder 110, and its center coordinate values are added to the coordinate values (x, y) of each pixel by the adder 110, thereby inversely transforming the coordinate values (x, y) of each pixel into coordinate values of the X-Y coordinate system shown in FIG. 14A. In addition, the B data subjected to correction of the chromatic aberration of magnification of the B color is inputted to the adder 114, and its center coordinate values are added to the coordinate values (x, y) of each pixel by the adder 114, thereby inversely transforming the coordinate values (x, y) of each pixel into coordinate values of the X-Y coordinate system shown in FIG. 14A.

The image data (RGB data), for which aberration correction has been provided in the above-described manner by using the integrated distortion correction parameters and the integrated parameters for correcting the chromatic aberrations of magnification of the R data and the B data, is outputted from the first aberration correcting unit 88.

If the imaging-center coordinates (X0, Y0) and the reading-center coordinates (X0S, Y0S) coincide with each other or are located in proximity to each other within a predetermined allowable range, and if no trimming was effected or center trimming was effected, both the deterioration of image quality caused by the aberrations of the imaging lens 162 and the deterioration of image quality caused by the aberrations of the scanning lens 76 can be corrected simultaneously. Hence, efficient correction is realized.

On the other hand, if NO is the answer in the determination in Step 302 or Step 304, the operation proceeds to Step 314 to effect a changeover in the changeover unit 90 so that the image data outputted from the first aberration correcting unit 88 will be outputted to the second aberration correcting unit 92 (in FIG. 3, the changeover unit 90 is changed over downward). In an ensuing Step 316, the scanning-lens aberration correction parameters concerning distortion, chromatic aberrations of magnification of the R color, and chromatic aberrations of magnification of the B color, as well as the information on the reading-center coordinates (X0S, Y0S), are supplied to the first aberration correcting unit 88, while the imaging-lens aberration correction parameters concerning distortion, chromatic aberrations of magnification of the R color, and chromatic aberrations of magnification of the B color, as well as the information on the imaging-center coordinates (X0, Y0), are supplied to the second aberration correcting unit 92.

In an ensuing Step. 318, in the first aberration correcting unit 88, the deterioration of image quality caused by the aberrations of the scanning lens 76 is corrected by using the aforementioned scanning-lens aberration correction parameters. Here, the operation of the first aberration correcting unit 88 is similar to that of the aforementioned Step 312.

Then, after this correction, in Step 320, in the second aberration correcting unit 92, the deterioration of image quality caused by the aberrations of the imaging lens 162 is corrected by using the aforementioned imaging-lens aberration correction parameters. Here, the operation of the second aberration correcting unit 92 is similar to that of the aforementioned Step 312.

If the imaging-center coordinates (X0, Y0) and the reading-center coordinates (X0S, Y0S) are not located within a predetermined allowable range, and if trimming which is not center trimming was effected, correction of the deterioration of image quality caused by the aberrations of the scanning lens 76 and correction of the deterioration of image quality caused by the aberrations of the imaging lens 162 can be effected consecutively.

It should be noted that, in terms of the order of correction, either correction may be effected first. Namely, correction of the deterioration of image quality caused by the aberrations of the imaging lens 162 may be executed first.

Next, a description will be given of the second aberration correction processing in FIG. 9. In Step 292 in FIG. 9, on the basis of the aberration information of the scanning lens 76, the correction-parameter calculating unit 80 determines the scanning-lens aberration correction parameters for correcting the deterioration of image quality caused by these aberrations. In an ensuing Step 294, a changeover is effected in the changeover unit 90 so that the image data outputted from the first aberration correcting unit 88 will be directly outputted to an external unit located outside the image processing section 16 (in FIG. 3, the changeover unit 90 is changed over upward).

In an ensuing Step 296, the scanning-lens aberration correction parameters concerning distortion, chromatic aberrations of magnification of the R color, and chromatic aberrations of magnification of the B color, which were determined above, as well as the information on the reading-center coordinates (X0S, Y0S), are supplied to the first aberration correcting unit 88. Then, in an ensuing Step 298, in the first aberration correcting unit 88, the deterioration of image quality caused by the aberrations of the scanning lens 76 is corrected by using the aforementioned scanning-lens aberration correction parameters. Here, the operation of the first aberration correcting unit 88 is similar to that of the aforementioned Step 312.

Thus if the imaging lens 162 does not correspond to a lens whose aberrations are large (NO is the answer in the determination in Step 266 in FIG. 7), the second aberration correction processing in FIG. 9 is executed, and correction of the deterioration of image quality caused by only the aberrations of the scanning lens 76 is provided for the image data.

In accordance with the above-described embodiment, appropriate aberration correction is effected in correspondence with each of the three cases described below, and it is possible to obtain a photographic print of excellent quality which is free of deterioration of image quality caused by the aberrations of the scanning lens 76 and the aberrations of the imaging lens 162.

(1) In a first case (in a case where the imaging-center coordinates (X0, Y0) and the reading-center coordinates (X0S, Y0S) coincide with each other or are located in proximity to each other within a predetermined allowable range, and no trimming was effected or center trimming was effected), both the deterioration of image quality caused by the aberrations of the imaging lens 162 and the deterioration of image quality caused by the aberrations of the scanning lens 76 can be corrected simultaneously. Hence, efficient correction processing is realized.

(2) In a second case (in a case where the imaging-center coordinates (X0, Y0) and the reading-center coordinates (X0S, Y0S) are not located within a predetermined allowable range, and where trimming which is not center trimming was effected), correction of the deterioration of image quality caused by the aberrations of the scanning lens 76 and correction of the deterioration of image quality caused by the aberrations of the imaging lens 162 can be effected consecutively.

(3) In a third case (in a case where the imaging lens 162 does not correspond to a lens whose aberrations are large), correction processing concerning the aberrations of the imaging lens 162 is omitted, and correction of the deterioration of image quality caused by only the aberrations of the scanning lens 76 is executed. Namely, aberration correction can be effected appropriately in accordance with the relative magnitude of the aberration of the imaging lens 162.

In the above-described embodiment, a determination is made as to whether the amount of aberration of the imaging lens 162 is greater than or equal to a predetermined aberration amount by determining whether the imaging lens 162 corresponds to a lens having a large aberration. However, the present invention is not limited to the same, and the following structure may be utilized. An image of a reference subject projected through the imaging lens 162 is imaged on the photographic film 152. The reference subject image, which is recorded on the photographic film 152 by this imaging, is projected through the scanning lens 76, and is read. On the basis of the image data obtained by this reading, a determination as to whether the aberration amount of the imaging lens 162 is greater than or equal to a predetermined aberration amount is carried out.

Here, the reference photographed subject is, for example, a photographed subject having a portion which is linear in a predetermined direction such as the cross-ruled chart 150, a utility pole, a building or the like.

Further, the optical characteristic information of the imaging lens 162 may be obtained, and the determination as to whether the aberration amount of the imaging lens 162 is greater than or equal to a predetermined aberration amount may be carried out on the basis of the obtained optical characteristic information.

Here, the optical characteristic information of the imaging lens 162 includes, for example, the distortion aberration amount of the imaging lens 162 itself, the chromatic aberration of magnification, a decrease in the amount of peripheral light, or the like.

Although in the foregoing embodiment an example has been shown in which the lens identification data of the imaging lens 162 is recorded in advance in the photographic film 152 as a latent-image bar code 156, the lens identification data may be recorded as a bar code on a cartridge 158 (see FIG. 12) of the photographic film 152, or the lens identification data itself may be printed on one of a casing of the lens fitted film package 160, the cartridge 158, and the photographic film 152.

What is claimed is:

1. An aberration correcting method wherein after an image of a subject projected through a first lens is imaged by imaging means in which a photographic photosensitive material is loaded, aberration correction is performed with respect to image data obtained by projecting through a second lens the subject image recorded on the photographic photosensitive material by the imaging, and by reading of the subject image by image reading means, comprising the steps of:

obtaining information on the aberration of said first lens and information on the aberration of said second lens; and with respect to the image data representing the subject image and obtained by reading with said image reading means, simultaneously correcting declines in image quality of the subject image represented by the image data, which declines are due to the aberrations of said first and said second lenses, on the basis of the obtained information on the aberrations of said first and said second lenses.

2. An aberration correcting method according to claim 1, wherein the information on the aberration of said lenses is any of information expressing the aberration of the lens, a correction parameter for correcting an aberration of the lens, and information expressing the type of said imaging means.

3. An aberration correcting method according to claim 1, wherein an image of a predetermined image for inspection which is projected via said second lens is read by said image reading means, resulting in a distortion of said predetermined image for inspection, which distortion is caused by aberration of said second lens, is detected on the basis of the image data obtained by the reading, and the information on the aberration of said second lens is determined from the detected distortion of said predetermined image of the image for inspection.

4. The aberration correcting method according to claim 3, wherein the image for inspection is an image in which a plurality of straight lines are respectively depicted in a plurality of predetermined directions.

5. The aberration correcting method according to claim 1, wherein after information on the aberrations of various types of lenses is stored in advance for each item of lens identification information, lens identification information concerning said first lens and said second lens is obtained, and information on the aberrations of lenses corresponding to the identification information is obtained, thereby obtaining the information on the aberration of said first lens and the information on the aberration of said second lens.

6. The aberration correcting method according to claim 1, wherein the information on the aberration of said first lens and the information on the aberration of said second lens are obtained through direct measurement.

7. An aberration correcting method wherein after an image of a subject projected through a first lens is imaged by imaging means in which a photographic photosensitive material is loaded, aberration correction is performed with respect to image data obtained by projecting through a second lens the subject image recorded on the photographic photosensitive material by the imaging, and by reading of the subject image by image reading means, comprising the steps of:

obtaining information on the aberration of said first lens and information on the aberration of said second lens;

determining whether or not an aberration amount of said first lens is greater than or equal to a predetermined aberration amount; and if the aberration amount of said first lens is greater than or equal to the predetermined aberration amount, with respect to the image data, simultaneously correcting declines in the image quality of the subject image represented by the image data, which declines are due to the aberrations of said first and said second lenses, on the basis of the information on the aberrations of said first and said second lenses, and if the aberration amount of said first lens is less than the predetermined aberration amount, with respect to the image data, correcting the decline in the image quality of the subject image represented by the image data, which decline is due to the aberration of said second lens, on the basis of the information on the aberration of said second lens.

8. An aberration correcting method according to claim 7, wherein it is determined whether or not the aberration amount of said first lens is greater than or equal to the predetermined aberration amount by determining whether said first lens corresponds to one of predetermined lenses whose aberrations are large.

9. An aberration correcting method according to claim 7, wherein whether or not the aberration amount of said first lens is greater than or equal to the predetermined aberration amount is determined on the basis of image data which is obtained by imaging an image of a reference subject projected via said first lens onto the photographic photosensitive material, and projecting via said second lens a reference subject image which is recorded on the photographic photosensitive material by the imaging, and reading the projected image by said image reading means so as to obtain the image data.

10. An aberration correcting method according to claim 7, wherein optical characteristic information of said first lens is obtained, and whether or not the aberration amount of said first lens is greater than or equal to the predetermined aberration amount is determined on the basis of the obtained optical characteristic information.

11. The aberration correcting method according to claim 7, wherein correction parameters are determined for correcting the declines in the image quality of the subject image caused by the respective aberrations of said first lens and said second lens, wherein correction parameters are determined for simultaneously correcting the declines in the image quality of the subject image represented by the image data, which declines are due to the aberrations of said first and said second lenses, by integrating the determined correction parameter concerning said first lens and the determined correction parameter concerning said second lens, and wherein correction is effected with respect to the image data obtained by the reading by said image reading means, in accordance with the correction parameters determined for simultaneous correction.

12. A system for image processing, wherein an image of a subject has been recorded onto an imaging material by projecting through an imaging lens, said system comprising:

a scanning unit configured to scan said imaging material, wherein said scanning unit includes a scanning lens in which said image is projected through; and an image processing unit configured to correct aberrations of said imaging and scanning lenses.

13. The system of claim 12, wherein said image processing unit comprises:

a storage unit configured to store aberration information of said imaging and scanning lenses;

a correction-parameter calculating unit configured to calculate aberration correction parameters based on aberration information of said imaging and scanning lenses from said storage unit;

an aberration correcting unit configured to correct said aberration of at least said scanning lens based on said aberration corection parameters from said correction-parameter calculating unit.

14. The system of claim 13, wherein said image processing unit further comprises an aberration calculating unit configured to determine aberration information of said scanning lens.

15. The system of claim 14, wherein said aberration calculating unit is configured to store said determined aberration information of said scanning lens into said storage unit.

16. The system of claim 14, wherein said aberration calculating unit is configured to determine said aberration information of said scanning lens based on distortions of a reference image data projected through said scanning lens.

17. The system of claim 16, wherein said storage unit is configured to store a reference image data.

18. The system of claim 13, wherein:

said storage unit is configured to store aberration information of predetermined lens types; and said scanning unit is configured to identify a lens type of said imaging lens recorded on said imaging material and to retrieve said aberation information of said imaging lens from said storage unit based on said lens type.

19. The system of claim 13, wherein said aberration correction parameters include distortion correction parameters, and wherein said aberration correcting unit comprises a distortion correcting unit configured to correct for distortions based on said distortion correction parameters.

20. The system of claim 19, wherein said aberration correction parameters further include chromatic magnification aberration parameters, and wherein said aberration correcting unit further comprises first and second color chromatic magnification aberration correcting units configured to correct for chromatic magnification aberrations of first and second colors based on said chromatic magnification aberration parameters.

21. The system of claim 20, wherein said aberration correcting unit is configured to simultaneously correct for aberrations of both said imaging and scanning lenses.

22. The system of claim 20, wherein said aberration correcting unit is a first aberration correcting unit and said image processing unit includes a second aberration correcting unit, wherein said first aberration correcting unit corrects for aberration of one of said imaging and scanning lenses, and said second aberration correcting unit corrects for aberration of the other of said imaging and scanning lenses.

23. A method for image processing, wherein an image of a subject has been recorded onto an imaging material by projecting through a imaging lens, said method comprising:
scanning said imaging material by projecting said image through a scanning lens; and
correcting aberrations of said imaging and scanning lenses.

24. The method of claim 23, further comprising:
retrieving aberration information of said imaging and scanning lenses from a storage unit;
calculating aberration correction parameters based on aberration information of said imaging and scanning lenses;
correcting said aberration of at least said scanning lens based on said aberration corection parameters.

25. The method of claim 24, further comprising determining aberration information of said scanning lens.

26. The method of claim 25, further comprising storing said determined aberration information of said scanning lens into said storage unit.

27. The method of claim 25, wherein said step of determining aberration information comprises:
projecting a reference image data through said scanning lens; and
determining said aberration information of said scanning lens based on distortions of said projected reference image data.

28. The method of claim 24, wherein said storage unit is configured to store aberration information of predetermined lens types, and wherein said step of retrieving comprises:
identifying a lens type of said imaging lens recorded on said imaging material; and
retrieving said aberation information of said imaging lens from said storage unit based on said lens type.

29. The method of claim 24, wherein said aberration correction parameters include distortion correction parameters, and wherein step of correcting comprises correcting for distortions based on said distortion correction parameters.

30. The method of claim 29, wherein said aberration correction parameters further include chromatic magnification aberration parameters, and wherein said step of correcting further comprises correcting for chromatic magnification aberrations of first and second colors based on said chromatic magnification aberration parameters.

31. The method of claim 24, further comprising:
determining whether an aberration of said imaging lens is within a predefined tolerance level, wherein the correcting step comprises:
correcting for aberration of said scanning lens only if said aberration of said imaging lens is within said predefined tolerance level; and
correcting for aberrations of said imaging and scanning lenses if said aberration of said imaging lens is outside of said predefined tolerance level.

* * * * *